(12) United States Patent
Matoba et al.

(10) Patent No.: US 8,120,826 B2
(45) Date of Patent: Feb. 21, 2012

(54) OPTICAL INFORMATION RECORDER (REFLECTION HOLOGRAPHIC MEMORY DEVICE)

(75) Inventors: Osamu Matoba, Hyogo (JP); Yuji Yokohama, Hyogo (JP)

(73) Assignee: National University Corporation Kobe University, Hyogo (JP)

( * ) Notice: Subject to any disclaimer, the term of this patent is extended or adjusted under 35 U.S.C. 154(b) by 342 days.

(21) Appl. No.: 11/794,727

(22) PCT Filed: Nov. 7, 2005

(86) PCT No.: PCT/JP2005/020357
§ 371 (c)(1),
(2), (4) Date: Jul. 5, 2007

(87) PCT Pub. No.: WO2006/082678
PCT Pub. Date: Aug. 10, 2006

(65) Prior Publication Data
US 2009/0122376 A1 May 14, 2009

(30) Foreign Application Priority Data

Jan. 6, 2005 (JP) .................................... 2005-1430
May 6, 2005 (JP) ................................ 2005-135200

(51) Int. Cl.
*G03H 1/10* (2006.01)
*G03H 1/12* (2006.01)
(52) U.S. Cl. ............................. 359/10; 359/11; 369/103
(58) Field of Classification Search .................... 359/10, 359/11, 24; 369/103
See application file for complete search history.

(56) References Cited

U.S. PATENT DOCUMENTS

| 5,719,691 | A | 2/1998 | Curtis et al. | |
|---|---|---|---|---|
| 2003/0039001 | A1* | 2/2003 | King et al. | 359/35 |
| 2004/0027968 | A1* | 2/2004 | Horimai | 369/103 |
| 2004/0165518 | A1* | 8/2004 | Horimai et al. | 369/94 |
| 2004/0179457 | A1* | 9/2004 | Hirao et al. | 369/275.3 |
| 2004/0180266 | A1* | 9/2004 | Hirao et al. | 430/1 |
| 2005/0036436 | A1* | 2/2005 | Horimai et al. | 369/118 |

FOREIGN PATENT DOCUMENTS

| JP | A-61-243403 | 10/1986 |
|---|---|---|
| JP | A-11-088098 | 3/1999 |
| JP | A-11-126335 | 5/1999 |
| JP | A-11-133842 | 5/1999 |
| JP | A-2004-279443 | 10/2004 |
| JP | A-2004-280899 | 10/2004 |
| JP | A-2004-335044 | 11/2004 |

OTHER PUBLICATIONS

International Search Report for corresponding International application No. PCT/JP2005/020357 mailed on Feb. 21, 2006. International Preliminary Report on Patentability and Written Opinion of the International Searching Authority for corresponding International application No. PCT/JP2005/020357 mailed Jul. 10, 2007.
O. Matoba, "Atarashii Kogakuteki Angoka Gijutsu ["New Optical Encryption Technology"]," *Japanese Journal of Optics*, vol. 29, No. 7, pp. 419-425 (Jul. 29, 2000) (discussed on p. 3 of the specification).
O. Matoba, et al., "Encrypted Optical Memory System Using Three-Dimensional Keys in Fresnel Domain," *Optics Letters*, vol. 24, No. 11, pp. 762-764 (Jun. 1, 1999) (discussed on p. 3 of the specification).

* cited by examiner

*Primary Examiner* — Jade R Chwasz
(74) *Attorney, Agent, or Firm* — Posz Law Group, PLC

(57) ABSTRACT

A holographic memory device is described which records and reproduces binary image data by irradiating a holographic recording medium with signal light and reference light. The holographic memory device includes a system for aligning polarization of the signal light and reference light on the holographic recording medium by guiding the signal light and the reference light to be coaxially opposed. The holographic memory device further includes a random-phase modulation multiplex recorder and spatial-shift multiplex recorder that, together with the system for aligning polarization, significantly enhances recording density and improves recording capacity.

8 Claims, 21 Drawing Sheets

(a) Signal image   (b) Offset = −20μm   (c) Offset = −10μm
(d) Offset = 0μm   (e) Offset = 20μm   (f) Offset = 10μm (a)　　　　　　　　(b)

(a) Offset = -3μm
(b) Offset = -2μm
(c) Offset = -1μm
(d) Offset = 0μm
(e) Offset = 2μm
(f) Offset = 3μm Offset = 0μm    Offset = 4μm    Offset = 8μm Offset = 0μm    Offset = 4μm    Offset = 8μm Offset = 12μm   Offset = 16μm   Offset = 20μm Offset = 12μm   Offset = 16μm   Offset = 20μm (a) Signal image    (b) Correct key    (c) Incorrect ke

OPTICAL INFORMATION RECORDER (REFLECTION HOLOGRAPHIC MEMORY DEVICE)

BACKGROUND OF THE INVENTION

The present invention relates to a technique for making practicable a holographic memory recording system having a large capacity and a data protection function, and more specifically, to a reflection holographic memory device being optimally consistent with rotation of a disk recording medium and radial movement of the disk recording medium (mechanism for operating an optical pick-up system).

At present, due to rapid development of optical communication technologies, computers, and imaging equipment, a numerous amount of information can be obtained from the Internet and high-definition broadcasting, etc. To record and store this enormous amount of information, in addition to hard disks using magnetic information recording, the usefulness of external recording media for the terabyte class has increased. In addition, limitations on optical memory technology according to reductions in the wavelength of light sources is on the horizon, while research on optical memories is advancing to multilayer and three-dimensional applications. Under these circumstances, holographic memories which enable parallel reading of image data have been researched domestically and overseas as next-generation recording media which realizes a recording capacity of more than 1 terabyte by using three-dimensional space of the media as well as high-speed reading and transfer of 10 gigabytes per second as a data transfer rate.

Conventionally, as holographic memory recording systems, there are available a transmission hologram and a reflection hologram. For multiplex recording of a transmission hologram, an angle multiplex recording system, a spatial shift multiplex recording system, and a random-phase modulation multiplex recording system, etc., have been made practicable, and on the other hand, for multiplex recording of a reflection hologram, only the angle multiplex recording system has been made practicable.

Under these circumstances, most of the systems made practicable are for the transmission hologram (for example, refer to Japanese Patent Application No. H11-88098).

Concerning holographic memories, the inventors of the present invention reported the results of research on optical memories having a recording data protection function by encrypting an original image based on the optical encryption technique, that is, the world's first random-phase modulation technology announced by the inventors (For example, refer to Encrypted Optical Memory System Using Three-Dimensional Keys in Fresnel Domain (O. Matoba and B/ Javidi, Opt. Lett., 24, 762-764 (1999)) and New Optical Encryption Technology (O. Matoba, et. al., Opt. 29 (2000))).

Furthermore, a system using a random-phase modulation mask in an arrangement of a transmission hologram is also known (for example, refer to U.S. Pat. No. 5,716,691).

SUMMARY OF THE INVENTION

Holographic memory devices using a cube recording medium which were conventionally researched are poor in consistency with existing optical memory technologies, and are low in cost performance when manufactured as products.

Therefore, a first object of the present invention is to realize an optimum consistency with techniques for mechanisms for operating optical pick-up systems represented by existing DVD techniques and improve cost performance of the production. A second object of the present invention is to realize a recording capacity tens to hundreds of times the recording capacity calculated from the in-plane diffraction limit of the recording medium, and a third object of the present invention is to realize an increase in recording capacity by multilayer. A fourth object is to provide a data protection function as hardware.

Herein, the mechanisms for operating an optical pick-up system are defined as mechanisms for rotating a disk recording medium and moving radially the disk recording medium.

The inventors researched earnestly for achieving the objects, and as a result, by using a disk recording medium, completed a reflection holographic memory device which is optimally consistent with mechanisms for operating optical pick-up systems represented by existing DVD techniques.

A first aspect of the present invention provides a reflection holographic memory device as a holographic recording and reproducing system which records binary image data as a light interference pattern by irradiating a holographic memory recording medium with a signal light beam and a reference light beam, and reproduces the data from a reproduced image obtained by irradiating the holographic memory recording medium with a reference light beam, wherein (1) the holographic memory recording medium is a disk recording medium, and
the device increases the recording capacity of a reflection hologram by including:
(2) a mechanism for operating an optical pick-up system,
(3) a system for aligning polarization planes of the signal light beam and the reference light beam on the disk recording medium by guiding the signal light beam and the reference light beam so as to be opposed to each other,
(4) a random-phase modulation multiplex recording means provided in a light guide path of the signal light beam and/or the reference light beam, and
(5) a spatial-shift multiplex recording means which involves shifting of the reference light beam by using the mechanism for operating the optical pick-up system.

The reflection holographic memory device of the present invention is characterized by having a construction in which recording as a holographic memory is a reflection type. Herein, the reflection type means an optical system which performs recording by opposing a signal light beam and a reference light beam to each other.

In addition, by using the spatial shift multiplex recording method and the random-phase modulation multiplex recording method at the same time, the recording capacity of the holographic memory using the disk recording medium was successfully increased. Furthermore, in the reflection holographic memory, it was proven that the recording capacity improvement effect and the encryption effect were obtained by using a random phase mask.

A second aspect of the present invention provides the reflection holographic memory device according to the first aspect of the present invention, wherein a system for aligning polarization planes of a signal light beam and a reference light beam on the disk recording medium, directs coaxially the signal light beam and the reference light beam linear polarization states which are different by 90 degrees from each other in the same direction, converges these by a condenser lens and irradiates these onto the disk recording medium, and after transmitting only the reference light beam through the disk recording medium, aligns the polarization state of the reference light beam with that of the signal light beam by using a quarter wavelength plate and a reflecting mirror, and opposes the signal light beam and the reference light beam from each other.

By using spatially optically modulated light waves for the signal light beam and/or the reference light beam, input images can be recorded while providing these with spatial overlaps, so that high-capacity recording becomes possible. By combining a spatial-shift multiplex recording means using this spatial light modulation and a random-phase modulation multiplex recording means, a higher recording capacity can be realized.

A third aspect of the present invention provides the reflection holographic memory device according to the first or second aspect, wherein a shift selective distance is selected so as to be in inverse proportion to substantially a square of the numerical aperture of the condenser lens in the spatial-shift multiplex recording means.

It has been verified through a simulation described later that the shift selective distance in the reflection holographic memory using spatial shift multiplex recording is provided in inverse proportion to substantially a square of the numerical aperture of the condenser lens. The shift selective distance is provided in inverse proportion to substantially a square of the numerical aperture of the condenser lens, so that the recording interval in multiplex recording must be set to be larger than a value in inverse proportion of the numerical aperture of the condenser lens, and smaller than a value in inverse proportion to a cube of the numerical aperture. Herein, the shift selective distance means a movement amount of a position at which the diffraction efficiency becomes half the maximum value due to movement of the position of the material.

A fourth aspect of the present invention provides the reflection holographic memory device according to any of the first through third aspects, wherein the random-phase modulation multiplex recording means uses a random phase mask or a pseudo random phase mask.

Herein, the random-phase modulation multiplex recording means performs multiplex recording via a random phase modulating means. As the random phase modulating means, a random phase mask or a phase spatial light modulator is available, however, the random phase mask is like ground glass, and by only passing through the mask, light can be randomly phase-modulated, and at the same time, the mask realizes a high speed and low cost.

A fifth aspect of the present invention provides the reflection holographic memory device according to any of the first through fourth aspects, wherein a quarter wavelength plate and a reflecting mirror are layered or included as an internal structure in the disk recording medium. It is also possible that the functions of the quarter wavelength plate and the reflecting mirror are included in the recording medium material, and thereby the construction of the reflection holographic memory device can be simplified.

A sixth aspect of the present invention provides the reflection holographic memory device according to any of the first through fifth aspects, wherein a scheduling recording means for adjusting the time for recording the signal light beam on the disk recording medium for each signal is provided. Thereby, also when the disk recording medium is data-rewritable, the intensities of the reproduced light beams of the respective signals can be made even.

A seventh aspect of the present invention provides the reflection holographic memory device according to any of the first through sixth aspects, wherein the random-phase modulation multiplex recording means is used as a light encrypting means and a means for improving the recording density. In the reflection holographic memory of the present invention, the random-phase modulation multiplex recording means such as the random phase mask can increase the recording capacity, and in addition, can also be used as a recording data protecting means by encrypting original images.

An eighth aspect of the present invention provides the reflection holographic memory device according to any of the first through seventh aspects, wherein three-dimensional distributions of a plurality of interference patterns caused by interference between a signal light beam and a reference light beam are recorded in a separable manner in the thickness direction of the disk recording medium, whereby the recording capacity is increased.

By using the reflection holographic memory device of the present invention, multilayer recording in the thickness direction becomes possible, so that high-capacity recording using the multilayer structure is realized. That is, the recording capacity of the multilayer recording is improved by using minute recording regions of the reflection hologram.

A ninth aspect of the present invention provides the reflection holographic memory device according to any of the first through eighth aspects, wherein the signal light beam is a single-colored blue laser beam, and a converging angle of the signal light beam by the condenser lens is 70 to 90 degrees.

The recording capacity of the reflection shift multiplex holographic memory device can be improved by shortening the wavelength of the laser for the signal light beam and the reference light beam and increasing the converging angle.

A tenth aspect of the present invention provides a reflection holographic memory simulator program which simulates a signal light beam converged by a condenser lens and diffracted light beams obtained from a reference light beam converged while coaxially opposed to the signal light beam, including the steps of: spatially propagating a signal light beam and a reference light beam; dividing the beams into plane waves with different angles; calculating a complex amplitude distribution of a reading light beam with respect to a refractive index distribution formed by each plane wave according to Kogelnik's coupled-wave theory, adding the complex amplitudes of diffracted light beams propagating in the same direction, and calculating phase shifts with respect to the respective plane wave components caused by a mechanism for operating an optical pick-up system.

Based on values of parameters obtained in numerical value calculation results made by this reflection holographic memory simulator program, the optical system can be optimized and the recording capacity can be improved.

The reflection holographic memory device of the present invention can use existing optical pickup techniques, so that an effect is brought about that barriers to make it practicable such as for industrial applications is low.

In addition, by combining the random-phase modulation multiplex recording means for applying modulation or the like by a random phase mask and the spatial-shift multiplex recording means involving rotation of the disk in the rotation axial direction and radial movement of the pickup system, the binary image data recording density can be improved. For example, an effect is brought about that a recording capacity of several hundred gigabytes to several terabytes is realized on, for example, a 5-inch disk.

In addition, when the random-phase modulation multiplex recording means such as the random phase mask is used, the full width at half maximum of diffraction efficiency can be narrowed, and multiplex recording at intervals of several micrometers can be realized. In actuality, even when bit data is carried on a signal light beam, multiplex recording can be performed at intervals of several micrometers, and the bit error ratecan be reduced to 1% or less.

In addition, by performing recording by using the random-phase modulation multiplex recording means such as the random phase mask, shift Bragg selectivity can be improved.

Furthermore, by performing recording by using the random-phase modulation multiplex recording means such as the random phase mask, signals are encrypted and recording data can be protected.

In comparison with the transmission type, the reflection holographic memory device according to the present invention offers a great advantage in that the region in the thickness direction of the interference pattern can be small, so that by performing recording by means of spatial separation in the thickness direction, the recording capacity can be increased by using the multilayer structure of the disk.

DETAILED DESCRIPTION OF THE PREFERRED EMBODIMENTS

Hereinafter, an embodiment of the present invention will be described with reference to the drawings.

Figure 1:
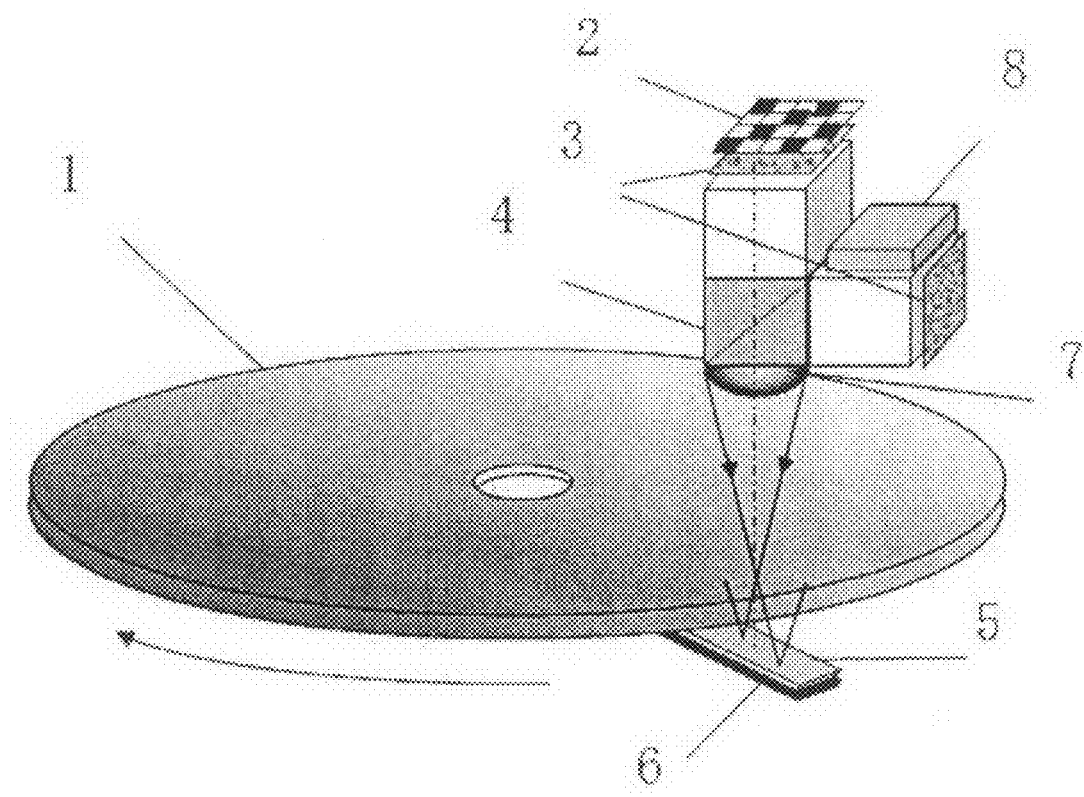
FIG. 1 is a general construction view of a reflection holographic memory.
Figure 2:
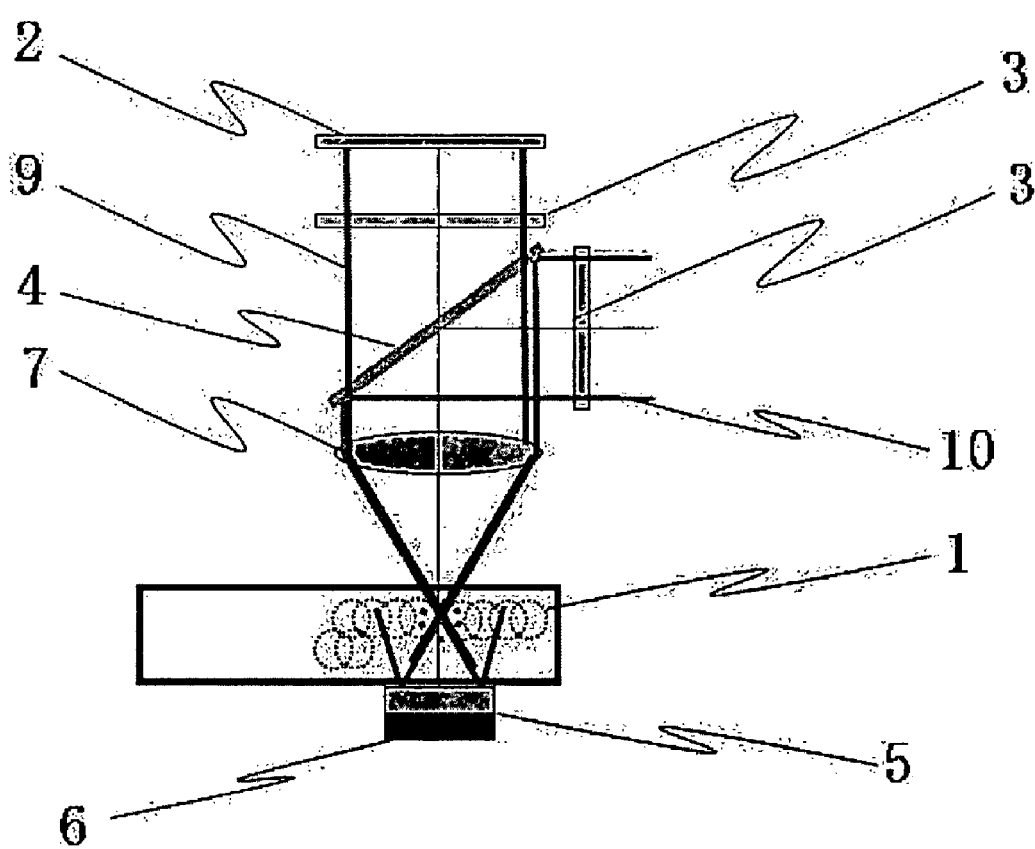
FIG. 2 is a principle view of the reflection holographic memory.

FIG. 1 is a general construction view of a reflection holographic memory device according to the present invention. FIG. 2 is a sectional view from the side of FIG. 1. In FIG. 2, a signal light beam 9 and a reference light beam 10 having polarization planes different by 90 degrees from each other are overlapped by a polarization beam splitter 4, and both light beams propagate coaxially, and are condensed by a condenser lens 7 and reach the disk recording medium 1.

At this time, focusing attention on the reference light beam 10, the reference light beam transmitted through the recording medium passes once through the quarter wavelength plate 5, and is reflected by the mirror 6, and passes through the quarter wavelength plate 5 again. Thus, due to two times of passage, the polarization planes of the signal light beam 9 and the reference light beam 10 are aligned with each other and recording is performed in the form of reflection.

Focusing attention on the signal light beam 9, the signal light beam transmitted through the disk recording medium 1 passes once through the quarter wavelength plate 5, and is reflected by the mirror 6, and then passes through the quarter wavelength plate 5 again. Thus, due to two times of passage, the polarization planes of the signal light beam 9 and the reference light beam 10 are aligned with each other and recording is performed in the form of reflection.

Herein, it is also possible that the quarter wavelength plate 5 and the reflecting mirror 6 are included so as to be layered or as an internal structure of the other one of these.

The reflection holographic memory device according to the present invention performs multiplexing by using existing techniques, so that it performs multiplex recording by using movements of an optical pick-up system, that is, using rotation of the disk and radial movement of the disk. For multiplexing by using the rotation of the disk and shift of the system, a spatial-shift multiplex recording means which performs multiplexing by shifting a reference light beam is used. The spatial-shift multiplex recording means performs multiplexing by using Bragg selectivity according to reference spherical waves by spatially shifting and recording the signal light beam, and when reading, by slightly changing the position of the reference light beam spot, only data with consistent shift Bragg selectivity becomes diffracted light beams, and independent reading can be performed.

In the reflection holographic memory having this spatial-shift multiplex recording means, by arranging a random-phase modulation multiplex recording means such as a random phase mask in a light guide path of the signal light beam and/or the reference light beam, the recording capacity is increased.

EXAMPLE 1

Usefulness of Spatial-Shift Multiplex Recording Means

Figure 3:
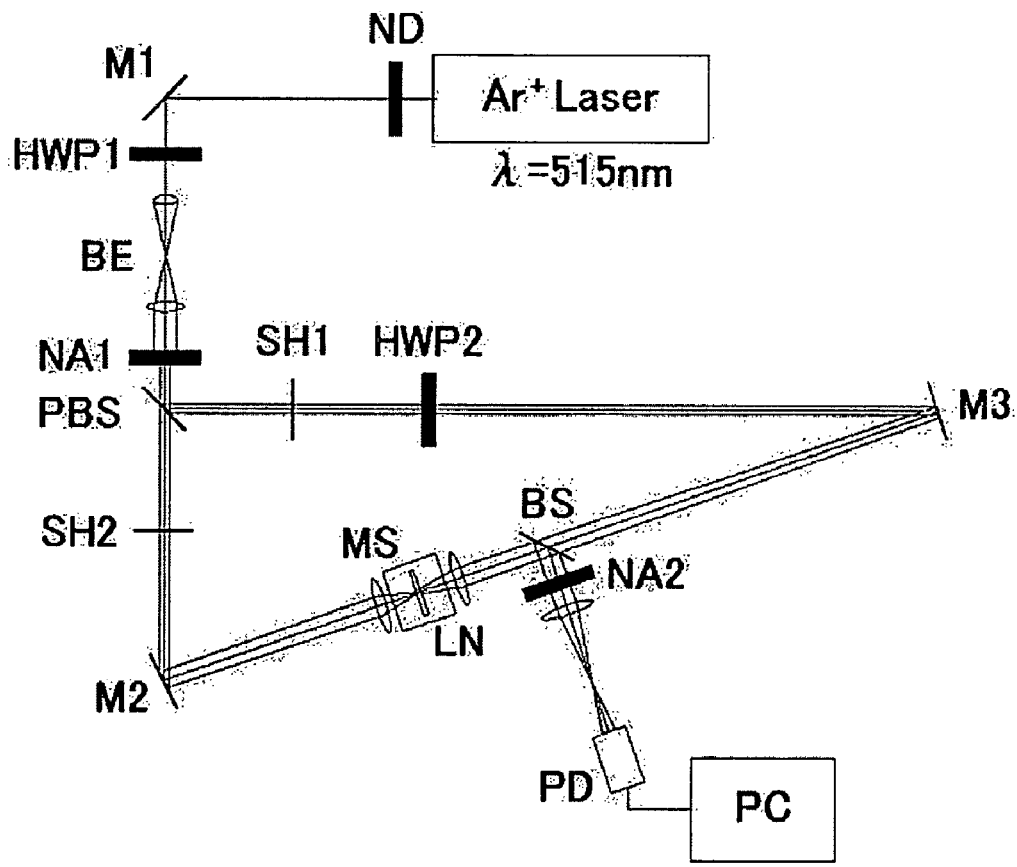
FIG. 3 shows an optical system (1) in the reflection holographic memory.

In Example 1, usefulness of the spatial-shift multiplex recording means in the reflection holographic memory of the present invention is shown. Herein, by constructing a reflection optical system as shown in FIG. 3 optically spatially developed from the optical system of FIG. 1 and FIG. 2, diffraction efficiency changes with respect to positional shift of the reference light beam are measured and compared with the reference light beam diameter to confirm the effect of the spatial shift Bragg selectivity, whereby the usefulness of the spatial-shift multiplex recording means is shown.

An argon ion laser with a wavelength of 515 nanometers is used as a light source, light from the laser is split into a signal light beam and a reference light beam by a polarization beam splitter, and by means of reflective arrangement in which the signal light beam and the reference light beam are opposed to each other, writing on the disk recording medium is performed. As the disk recording medium, 0.5 mm-thick disk-shaped lithium niobate ($LiNbO_3$) doped with iron ions is used. Both light beams become spherical waves by passing through lenses immediately before the recording medium and then reach the recording medium. At this time, in order to pseudo-reproduce rotation of the disk in the optical pick-up system, the recording medium is fixed to a movable stage (MS) movable in the axial direction perpendicular to the propagation direction of the signal and reference light beams. In this optical system, without applying modulation of bit data (without a spatial light modulating means), the signal light beam was recorded as plane waves, intensities of the diffracted light beams were measured with a photodetector while slightly moving the position of the reference light beam spot, whereby it was confirmed whether the shift Bragg selectivity was obtained. Herein, the focal lengths of the lenses placed on the signal light beam side and the reference light beam side are both 50 mm.

Figure 4:
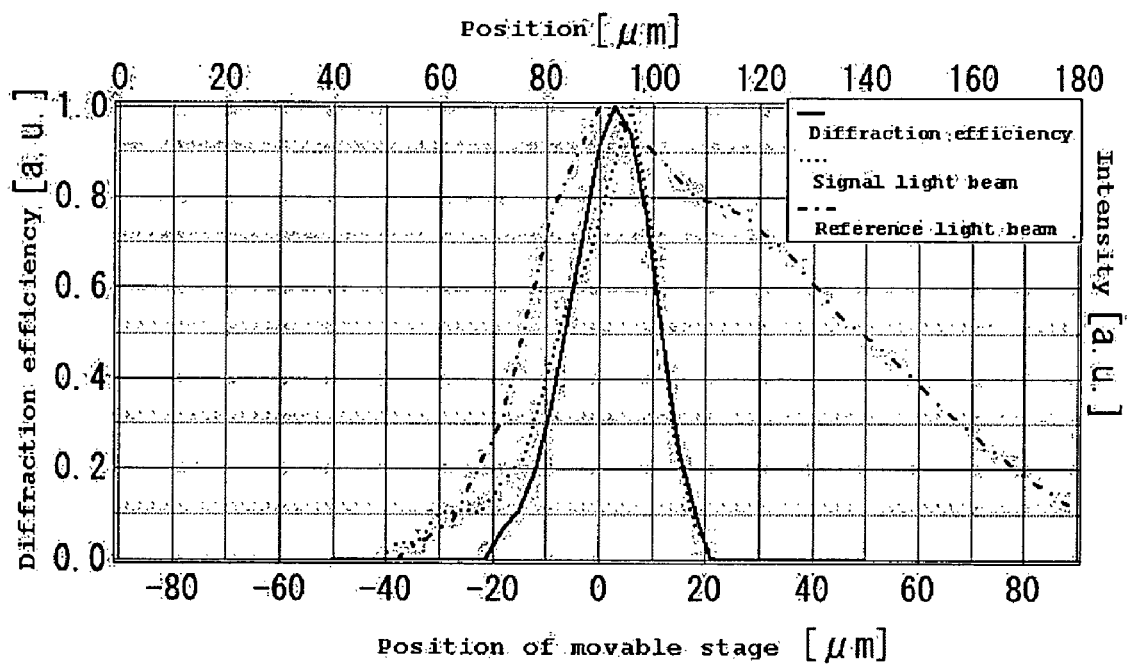
FIG. 4 is a correlation diagram of diffraction efficiency and beam diameter.

The relationship between the diffraction efficiency and the beam diameter obtained from the measurement results in this system is shown in FIG. 4. In FIG. 4, the horizontal axis on the lower side and the vertical axis on the left side are axes for diffraction efficiency, and the horizontal axis indicates shift of the reference light beam from the position at which the signal is recorded, and the vertical axis indicates standardized diffraction efficiency. The horizontal axis on the upper side indicates a scale of beam diameter, and the vertical axis on the right side indicates standardized beam intensity. From FIG. 4, the beam diameters ($1/e^2$ width) of the signal light beam and the reference light beam are 18.4 micrometers and 55.8 micrometers, respectively. The maximum value of the diffraction efficiency is 1.62%, and at this time, the intensities of the signal light beam and the reference light beam were 10.1 $mW/cm^2$ and 23.8 $mW/cm^2$, respectively, and the recording time was set to 20 seconds.

Focusing attention on the diffraction efficiency and the reference light beam spot, $1/e^2$ width becomes 15.7 micrometers in the diffraction efficiency and 55.8 micrometers in the reference light beam, and the diffraction efficiency greatly changes according to slight shift of the reference light beam with respect to the reference light beam spot size, so that it can be understood that the effect of the shift Bragg selectivity is obtained.

EXAMPLE 2

Shift Bragg Selectivity of Reproduced Images

Figure 5:
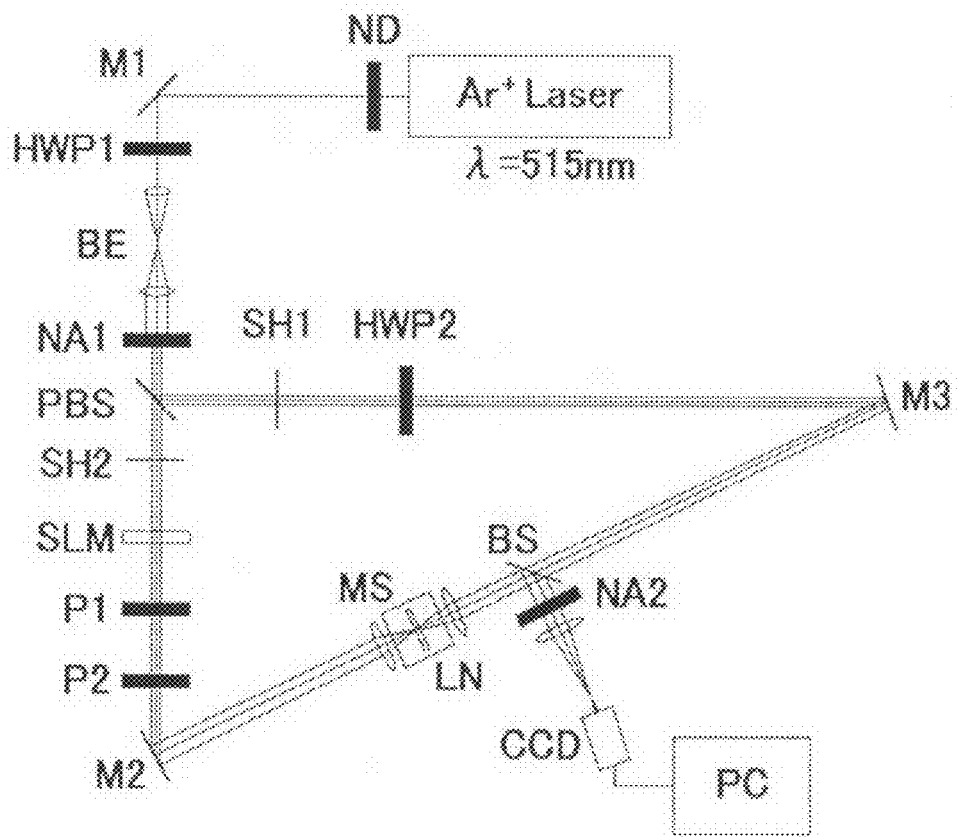
FIG. 5 shows an optical system (2) in the reflection holographic memory.
Figure 6:
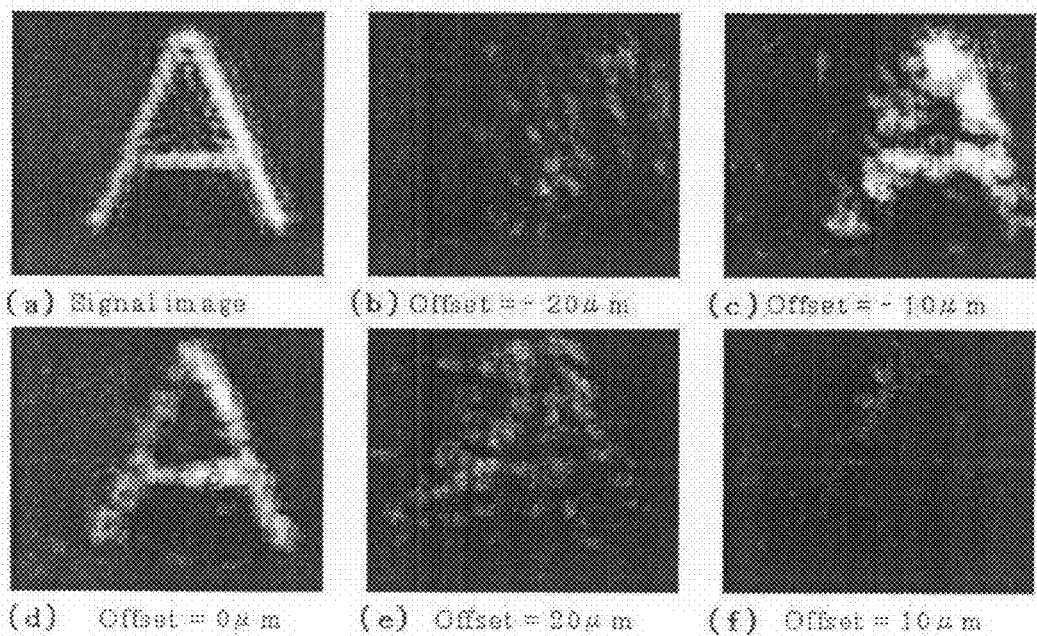
FIG. 6 show reproduced image examples through reference light beam shifts of the reflection holographic memory.

Next, in order to confirm whether reproduced images show shift Bragg selectivity, in actuality when images are carried on a signal light beam and recorded, the reproduced images with respect to shifts of the reference light beam from the recording position are investigated. The entire construction diagram of the optical system and the measurement results in this Example 2 are shown in FIG. 5 and FIGS. 6(*a*) through 6(*f*). In the construction of FIG. 5, in order to modulate image data to a signal light beam, a spatial light modulating means is arranged in a light guide path of the signal light beam in the construction of the optical system of FIG. 3. In FIG. 6, the image size is 130×130 (pixels). From the reproduced images of FIG. 6, when the movement position (offset) of lithium niobate is −20 micrometers and 20 micrometers, similar to the measurement results of FIG. 4, the reproduced light beam hardly appears, and when the offset is 0 micrometers, the original signal is reproduced. From this fact, it is understood that even when images are carried on a signal light beam and recorded, the effect of shift Bragg selectivity is obtained in reproduced images.

EXAMPLE 3

Improvement in Recording Capacity by Shift Multiplex Recording Means

Next, in Example 3, improvement in recording capacity by a shift multiplex recording means in the reflection holographic memory of the present invention will be described while showing data.

In Example 3, four signals were multiplex recorded by using the same optical system as in FIG. 3 and changing the recording interval to 28 micrometers, 26 micrometers, 24 micrometers, and 22 micrometers, and diffraction efficiency changes with respect to shifts of the reference light beam were measured. Herein, as in the case of Example 1, the signal light beam is recorded as plane waves without bit data modulation, and multiplex recording is performed by setting a recording time of 5 seconds for all signals without scheduling recording.

Figure 7:
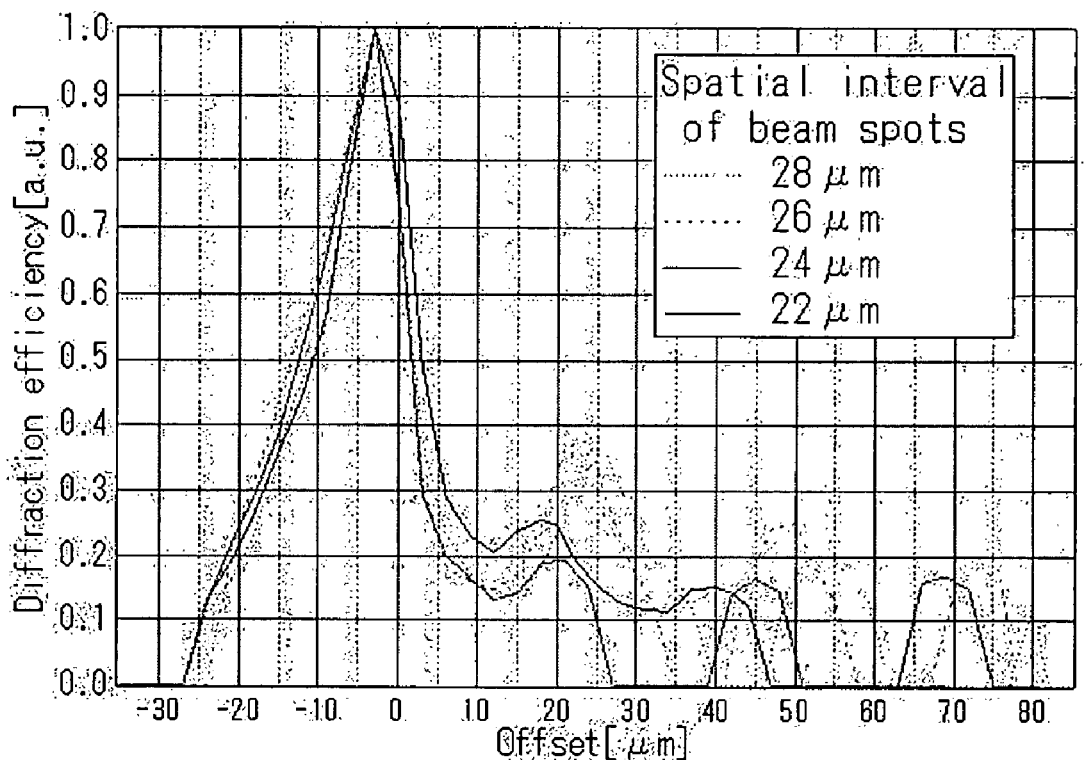
FIG. 7 is a measured data diagram of changes in diffraction efficiency with respect to reference light beam shifts.

The measurement results are shown in FIG. 7. In FIG. 7, zero on the horizontal axis corresponds to the position of the signal recorded last. From FIG. 7, when the recording interval is 28 micrometers, 26 micrometers, and 24 micrometers, four peaks of diffraction efficiency appear, and these correspond to individual recorded signals. That is, in this case, the individual signal light beams can be independently readout. The reason for extremely high diffraction efficiency of the last recorded signal is that, in the experiment, recording is performed from the right signal light beam, and the recording medium used is data-rewritable, so that when recording an adjacent signal, the erasing effect acts on a signal that has already been recorded.

Therefore, the diffraction efficiency of the last recorded signal that is not subjected to the erasing effect becomes higher than others, and the more right signal is subjected to more of the erasing effect, so that the diffraction efficiency is smaller. However, when the recording interval is 22 micrometers, the right end peak of the signal light beam is buried, so that independent data reading is impossible. From this fact, the limit of the recording interval in the system shown in this Example 3 can be considered as 24 micrometers.

Figure 8:
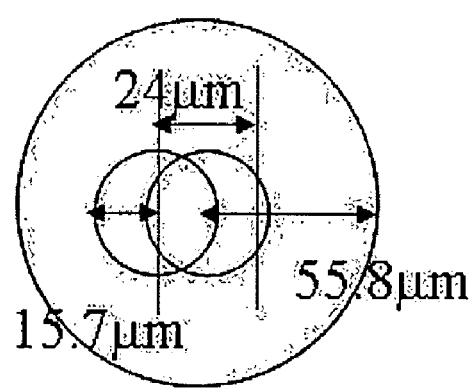
FIG. 8 is a relationship schematic view of a signal light beam and a reference light beam when the recording interval is 24 micrometers.

Herein, the relationship between the signal light beam and reference light beam spots when the recording interval is 24 micrometers is shown in FIG. 8. From FIG. 8, adjacent signal light beams have spatial overlap, so that it can be confirmed that multiplex recording is realized.

EXAMPLE 4

Evaluation of Reproduced Images when Using Shift Multiplex Recording Means

In this Example 4, in actuality, when images are carried on a signal light beam and recorded by using the spatial-shift multiplex recording means in the reflection holographic memory of the present invention, in order to investigate whether individual data can be independently readout, reproduced images are evaluated. In this Example 4, four signals are multiplex recorded by using the optical system of FIG. 5 and setting the recording interval to 24 micrometers and the recording time to 5 seconds for each signal, and reproduced images with respect to recording positions of the respective signals are taken by a CCD sensor.

Figure 9:
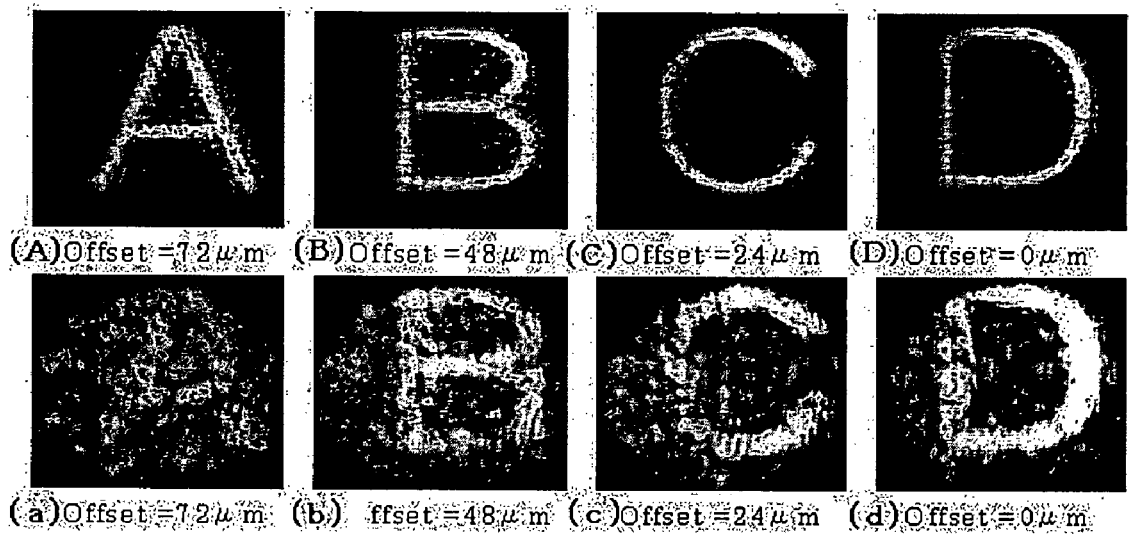
FIG. 9 are reproduced images via reference light beam shifts and signal images used for recording of the reflection holographic memory.

The reproduced images and signal images used for recording are shown in FIG. 9. The images (A) through (D) on the upper line of FIG. 9 are signal images, and the images (a) through (d) on the lower line of FIG. 9 are reproduced images. The image size is 130×130 (pixels), and the recording is changed in decreasing order of offset. FIG. 9 show that when the offset is 72 micrometers, the reproduced image is very weak, and on the other hand, when the offset is 0 micrometers, the brightness of the reproduced image is very high. This difference in brightness between the reproduced images corresponds to the diffraction efficiency change of FIG. 7, and the reason for an increase in brightness toward the later recording is that the erasing effect in the multiplex recording acts.

Although the reproduced images have a difference in brightness, no crosstalk is observed, and it is understood that individual data can be independently read out. It can be considered that the reason for observation of no crosstalk is that the shift Bragg selectivity sharply acts in this optical system. From the results of this measurement, it is proven that even when images are carried on a signal light beam and multiplex-recorded at intervals of 24 micrometers, individual reproduced images can be independently readout.

EXAMPLE 5

Image Quality Improvement of Reproduced Images by Using Random Phase Mask

Figure 10:
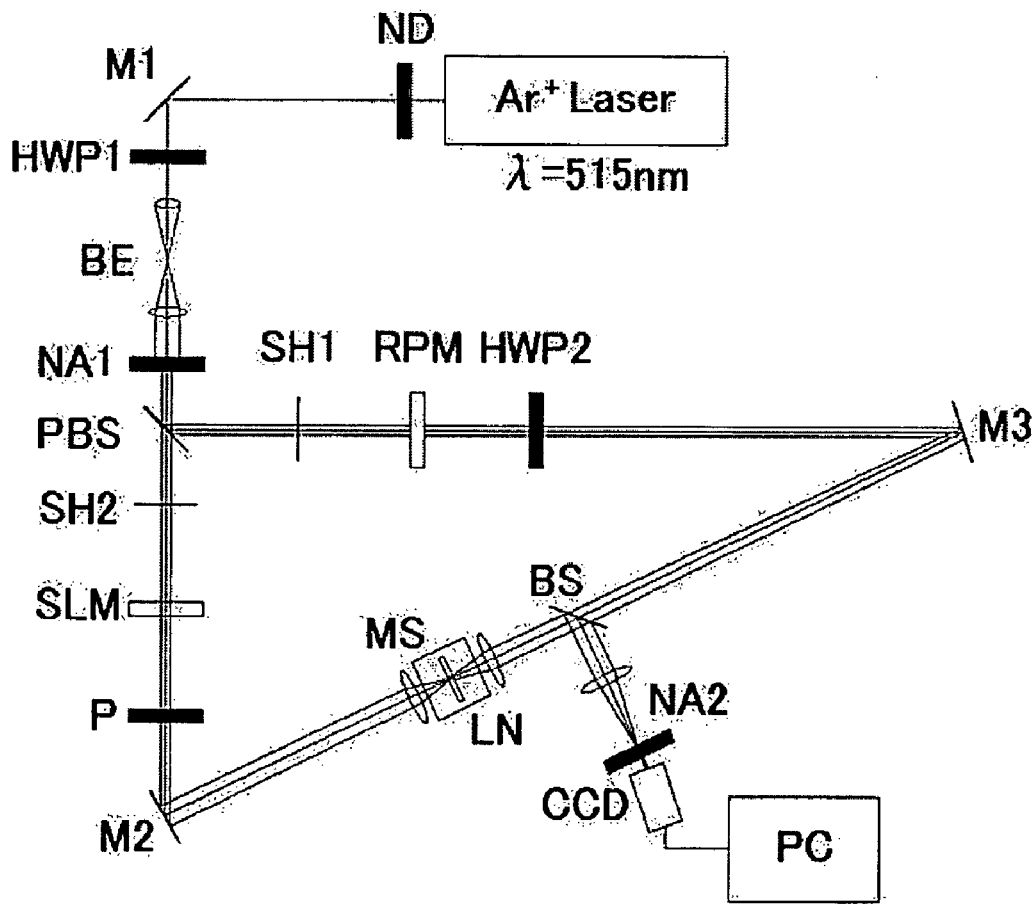
FIG. 10 shows an optical system (3) in the reflection holographic memory.

This Example 5 shows that the image quality of reproduced images can be improved by using a random phase mask in the reflection holographic memory. An optical system of Example 5 is shown in FIG. 10.

Hereinafter, the construction of the optical system of FIG. 10 will be described. First, an argon ion laser with a wavelength of 515 nanometers is used as a light source, and light is split into a signal light beam and a reference light beam by a polarization beam splitter. The signal light beam is subjected to bit data modulation by passing through a spatial light modulator, condensed by a lens, and reaches a recording medium. The reference light beam passes through the random phase mask, passes through a lens similar to the signal light beam, and is made incident from a direction opposite the signal light beam, and recorded in the form of reflection. When reading, only when the random phase mask key is the same as in the case of recording, signals are reproduced by the reference light beam, reproduced images are taken into a CCD camera and subjected to bit recognition processing in a personal computer (PC). As in the case of the above-descried example, the focal lengths of the lenses placed on the signal light beam side and the reference light beam side are both 50 mm, and a 0.5 mm-thick lithium niobate doped with iron ions is used as the recording medium.

Figure 11:
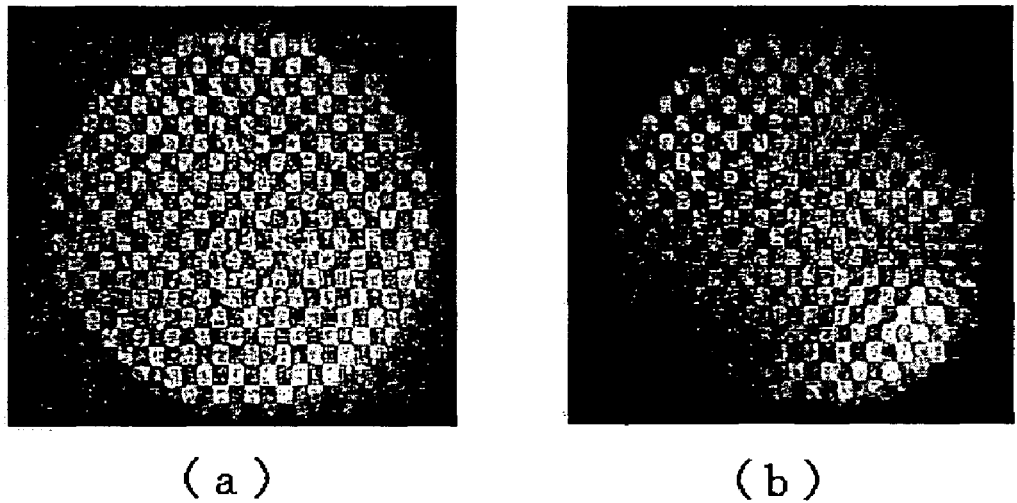
FIG. 11 show a reproduced image in encryption recording of the reference light beam and a reproduced image without encryption when a random phase mask is used in the reflection holographic memory.

A reproduced image in the case of recording through the random phase mask of the reference light beam and a reproduced image without passing through the random phase mask are shown in FIG. 11(a) and FIG. 11(b). From the figures, a clear difference can be seen by the naked eye when comparing these two reproduced images. From this fact, it can be considered that the condition of recording on the recording surface changes by letting the reference light beam pass through the random phase mask.

Figure 12:
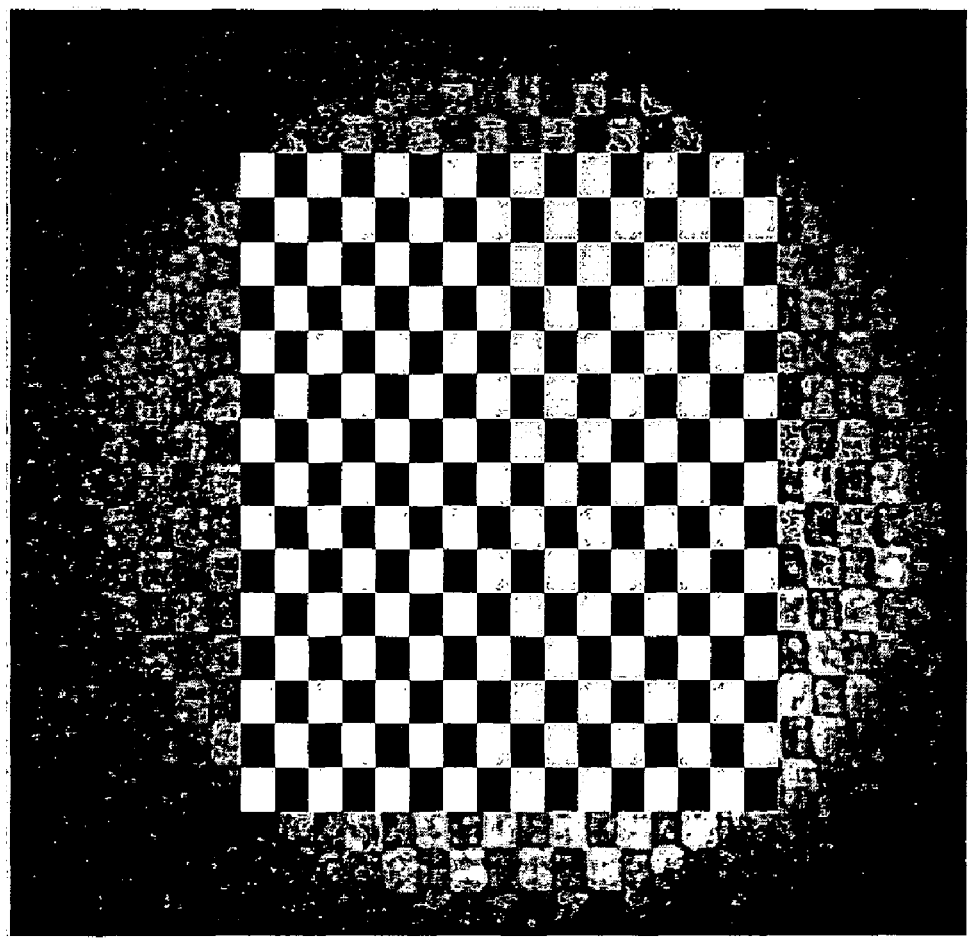
FIG. 12 shows a recognized image obtained by applying bit recognition processing to a reproduced image.

Furthermore, when the reproduced image of FIG. 11(a) was subjected to bit recognition processing, the recognized image becomes as shown in FIG. 12, and the bit error rate became 0.0%. From this fact, it is understood that the reproduced image in the case of recording using a random phase mask has sufficient image quality for bit recognition. In the method of bit recognition used herein, it is judged whether the brightness of each block is 1 or 0 by locally comparing the brightnesses between adjacent blocks by defining a total brightnesses of pixels included in each block as the brightness of the block.

Figure 13:
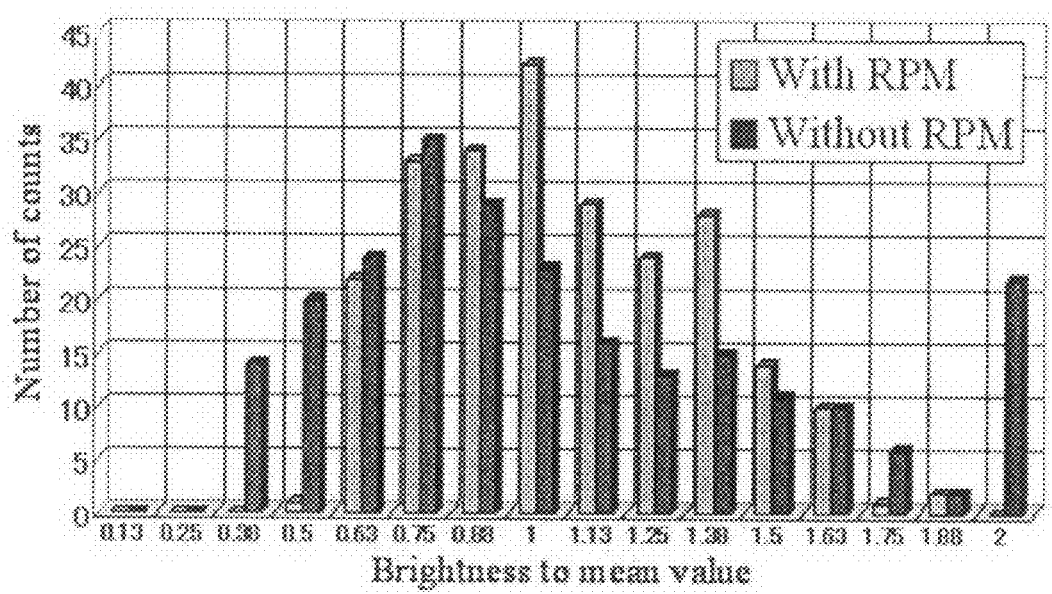
FIG. 13 is a distribution graph of blocks of each reproduced image with respect to a brightness mean value.

Herein, in order to more quantitatively compare the reproduced images of FIG. 11(a) and FIG. 11(b), for each reproduced image, brightnesses of blocks were classified with respect to a mean value of the brightnesses of the blocks in the above-described processing, and scattering of the distribution with respect to the mean value was investigated. The results of this investigation are shown in FIG. 13. In FIG. 13, the horizontal axis indicates a brightness ratio of each block with respect to the mean value, and the vertical axis indicates the number of counts. The reason for the large number of counts at 2 on the horizontal axis is that blocks with a brightness of 2 or more with respect to the mean value are all counted.

From FIG. 13, it is understood that when the random phase mask is not used, many blocks are too bright or too dark with respect to the mean value and the distribution scatters. On the other hand, when the random phase mask is used, too bright and too dark blocks are reduced and the scattering of the distribution becomes small. From this fact, it can be considered that the use of the random phase mask for recording reduces the scattering of the brightness distribution of reproduced images, and as a result, brings about an effect of improving the image quality of the reproduced images.

The reason for obtaining this effect is that, by letting the reference light beam pass through the random phase mask, the reference light beam spot diameter increases and the intensity unevenness is reduced.

EXAMPLE 6

Multiplex Recording Using Random Phase Mask

Figure 14:
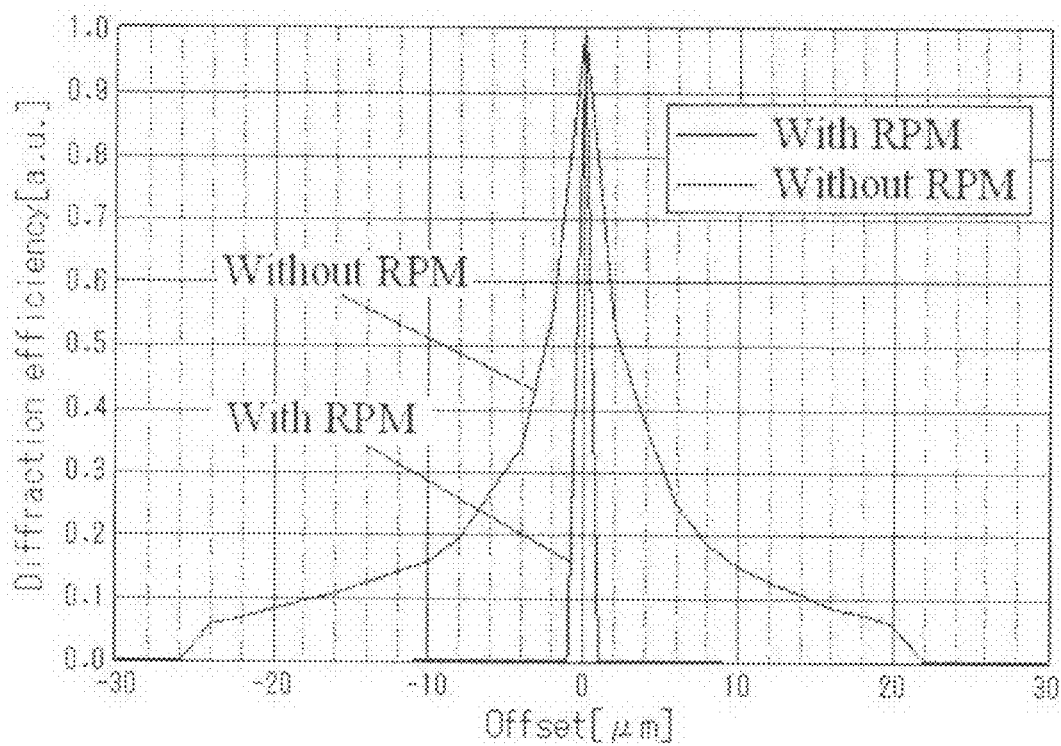
FIG. 14 is a correlation diagram of the diffraction efficiency and the beam diameter (when the random phase mask is used and not used)

In this Example 6, an influence of the random phase mask on the shift Bragg selectivity in the reflection holographic memory will be described. For this, in actuality, recording was performed by using a random phase mask and the diffraction efficiency with respect to the shift of the reference light beam from the recording position was measured. As an optical system of this Example 6, the same optical system as in FIG. 10 is used. However, an objective lens was used as the condenser lens for the signal light beam and the reference light beam and the CCD was changed to a photodetector. The measurement results in recording by using the random phase mask and the measurement results in normal recording (recording without using the random phase mask) are shown in FIG. 14. In FIG. 14, the horizontal axis indicates shift of the reference light beam from the position at which a signal is recorded and the vertical axis indicates standardized diffraction efficiency.

From FIG. 14, it is understood that the full width at half maximum of the diffraction efficiency in the normal recording is 4.9 micrometers, and on the other hand, when the random phase mask is used, the full width at half maximum becomes 1.0 micrometer, so that the full width at half maximum can be narrowed to about ⅕.

From this fact, it is understood that recording using the random phase mask improves the shift Bragg selectivity. The reason for this is considered that the phase distribution near the reference light beam spot is moderate in the normal recording, so that even if the reference light beam is slightly shifted, the state satisfying the shift Bragg condition continues to some degree, however, when the random phase mask is used, the phase distribution near the reference light beam spot becomes random, so that by only slightly shifting the reference light beam, phase shift of light waves in the reproduced light beam occurs, and the canceling effect due to interference increases.

Figure 22:
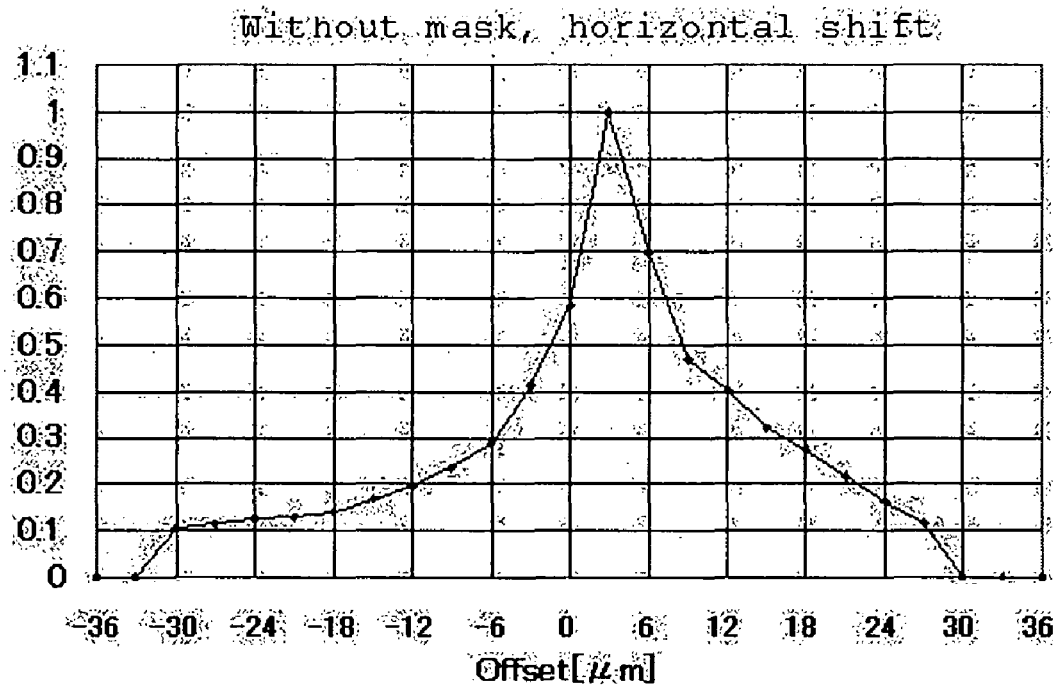
FIG. 22 shows diffraction efficiency with respect to horizontal shifts of the reference light beam (without using the random phase mask)
Figure 23:
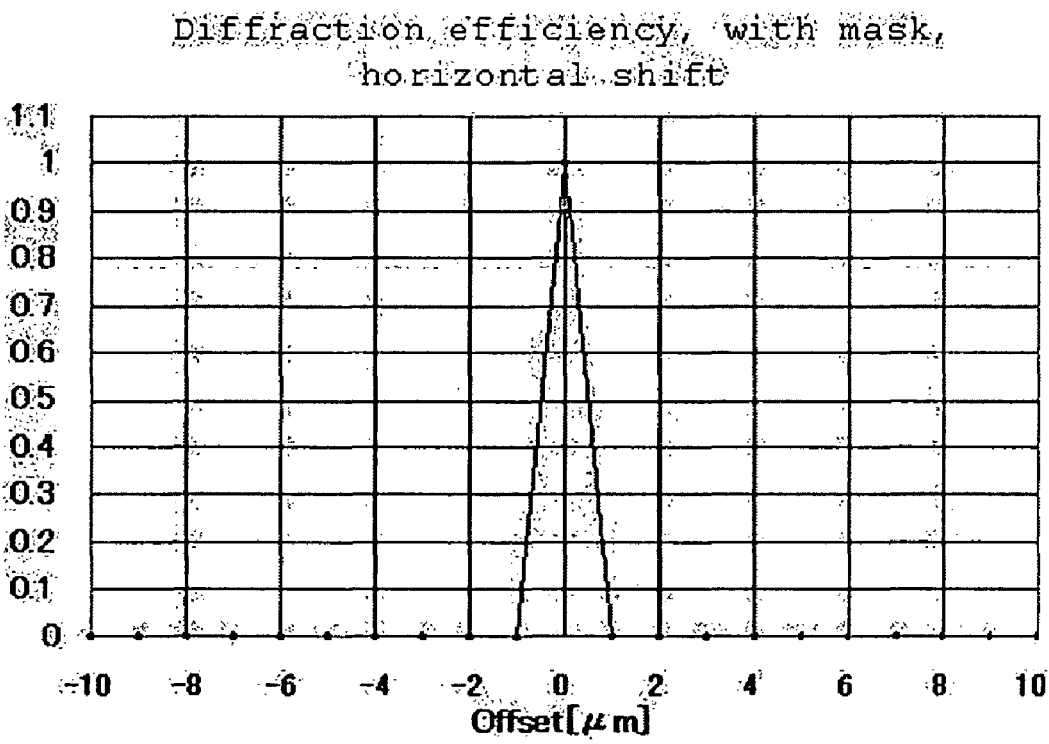
FIG. 23 shows diffraction efficiency with respect to horizontal shifts of the reference light beam (with using the random phase mask)
Figure 24:
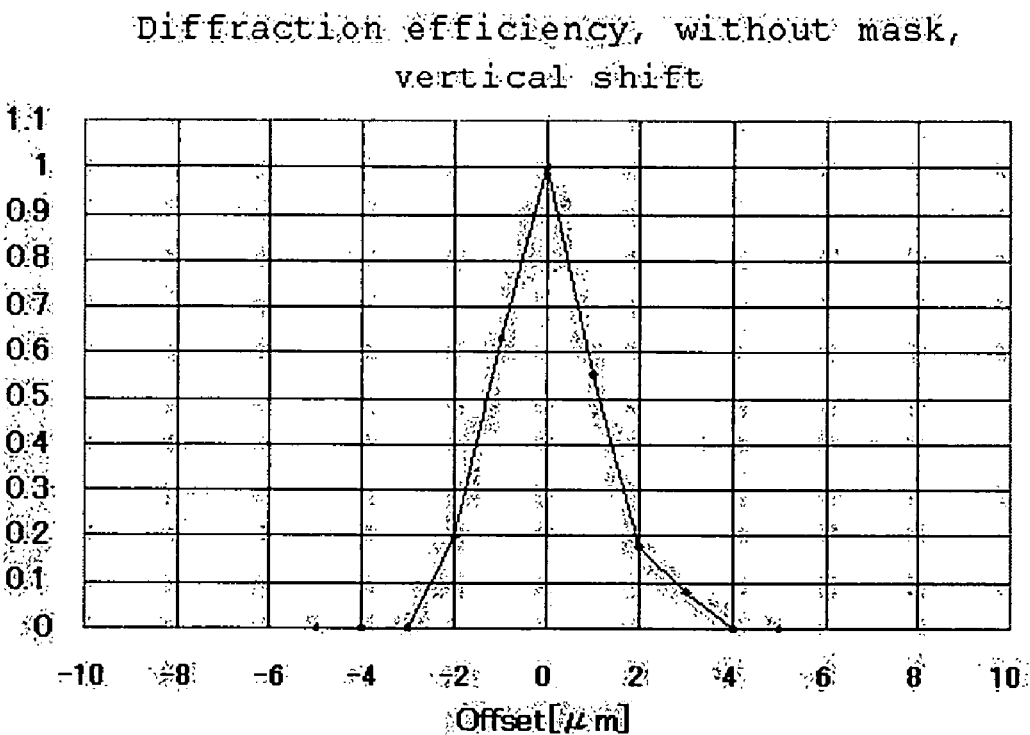
FIG. 24 shows diffraction efficiency with respect to vertical shifts of the reference light beam (without using the random phase mask)
Figure 25:
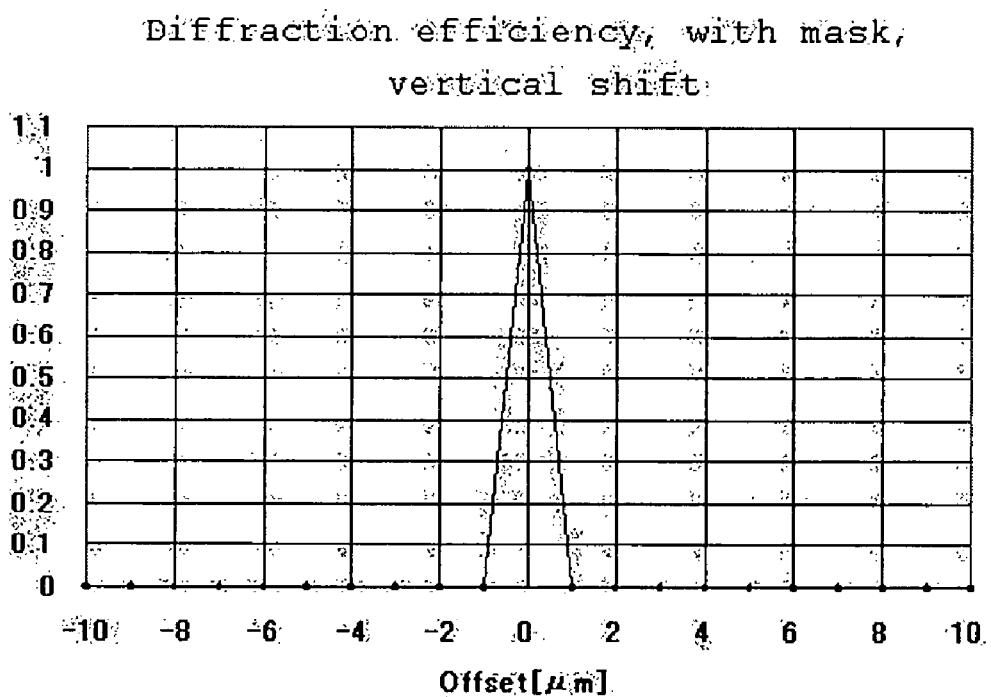
FIG. 25 shows diffraction efficiency with respect to vertical shifts of the reference light beam (with using the random phase mask)

Description will be given about a difference in diffraction efficiency with respect to the shift of the reference light beam between the case where the ransom phase mask is provided and the case where the random phase mask is not provided. FIG. 22 shows diffraction efficiency with respect to the horizontal shift of the reference light beam (without using the random phase mask) and FIG. 23 shows diffraction efficiency with respect to the horizontal shift of the reference light beam (with using the random phase mask). FIG. 24 shows diffraction efficiency with respect to the vertical shift of the reference light beam (without using the random phase mask) and FIG. 25 shows diffraction efficiency with respect to the vertical shift of the reference light beam (with using the random phase mask). In FIG. 22 through FIG. 25, as in the case of FIG. 14, the horizontal axis indicates shift of the reference light beam from the signal recording position, and the vertical axis indicates standardized diffraction efficiency.

As understood by comparing FIG. 22 and FIG. 23, and FIG. 24 and FIG. 25, by inserting the random phase mask, the full width at half maximum can be narrowed. From this fact, it is understood that concerning the reference light beam shift, the shift Bragg selectivity can be improved by performing recording by using the random phase mask.

Figure 15:
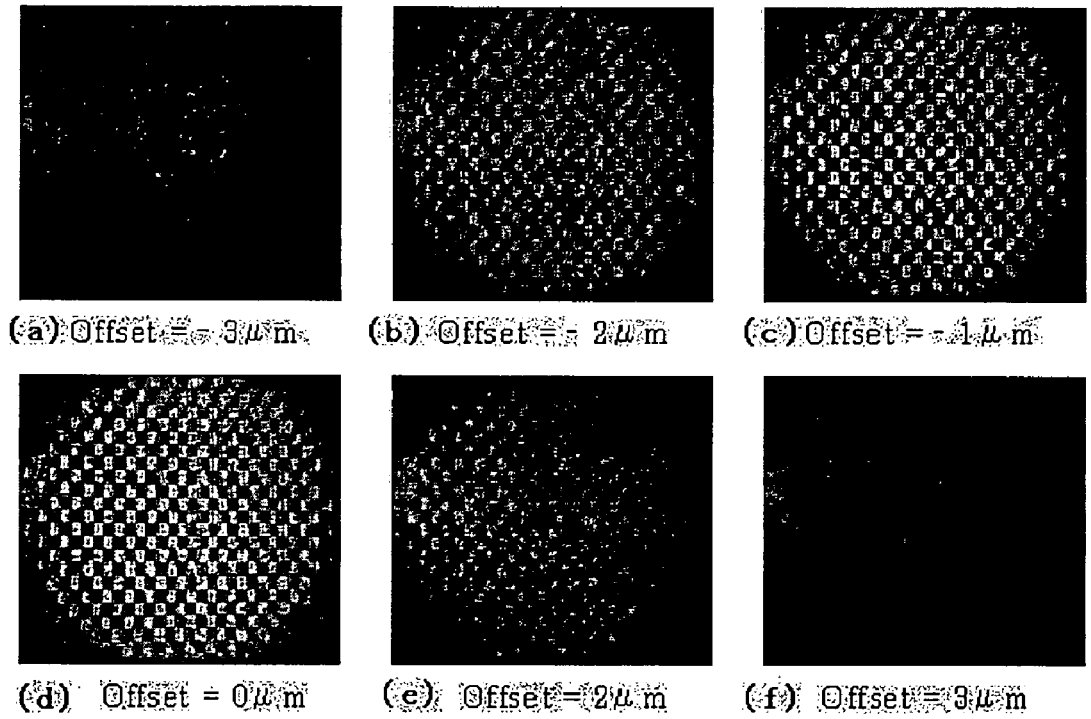
FIG. 15 show reproduced images with respect to reference light beam shifts from a recording position.

Next, reproduced images with respect to shifts of the reference light beam from the recording position when bit images were carried on a signal light beam and recorded by using the random phase mask, were investigated. The results of this investigation are shown in FIG. 15. From the reproduced images of FIG. 15(a) through FIG. 15(f), it can also be verified that the shift Bragg selectivity is improved by using the random phase mask in practical use.

EXAMPLE 7

Recording Interval and Scheduling Recording

Figure 16:
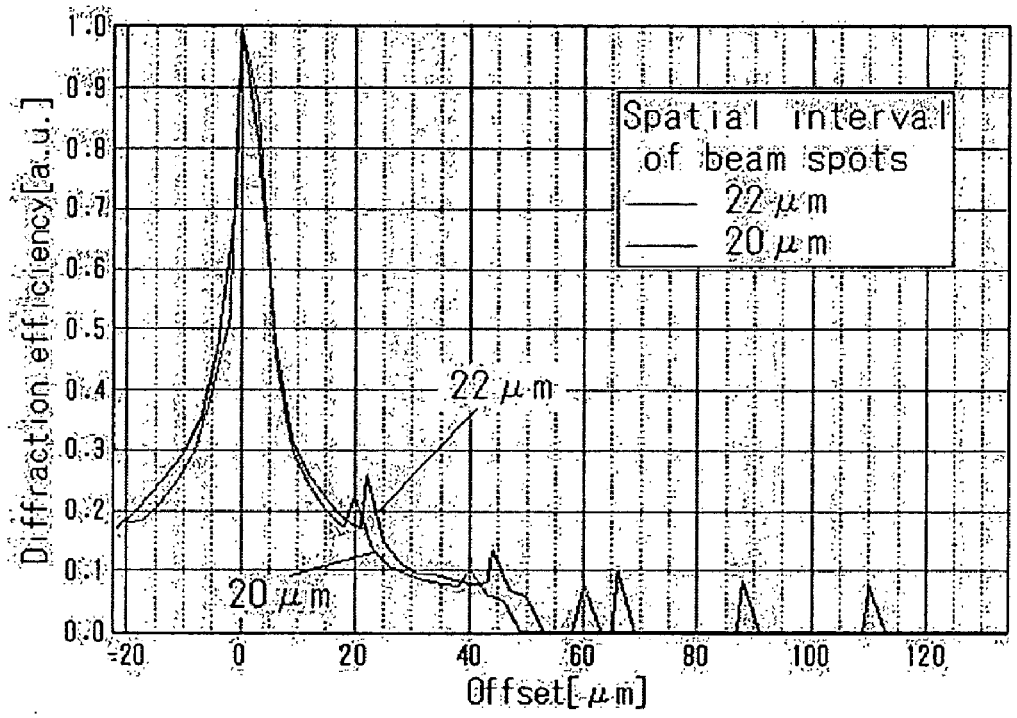
FIG. 16 shows multiplex recording (without using the random phase mask) according to reference light beam shifts.

In this Example 7, in the reflection holographic memory, multiplex recording is performed by using the random phase mask, and it is investigated to what extent the recording interval can be narrowed. First, for comparison, six signals were multiplex-recorded without using the random phase mask and diffraction efficiency changes with respect to the shifts of the reference light beam were measured. However, the multiplex recording was performed by setting the recording time to 5 seconds for all signals. The results of this recording are shown in FIG. 16. In FIG. 16, zero on the horizontal axis corresponds to the position of the signal that was recorded last.

When the recording interval is 22 micrometers, six peaks appear, and these correspond to individual recorded signals. That is, when six peaks appear, independent data reading is possible. The reason for the higher diffraction efficiency of the signal recorded last than that of other signals is considered that the recording medium used in this experiment is data-rewritable, and the erasing effect acts on a signal that has already been recorded when recording an adjacent signal. Therefore, the diffraction efficiency of the signal recorded last which is not subjected to the erasing effect is higher than that of other signals. Herein, focusing attention on the case where the recording interval is 20 micrometers, the last two peaks do not appear, and this proves that all data cannot be readout in this case. That is, when the random phase mask is not used, the recording interval for this experimental system is considered as 22 micrometers.

Figure 17:
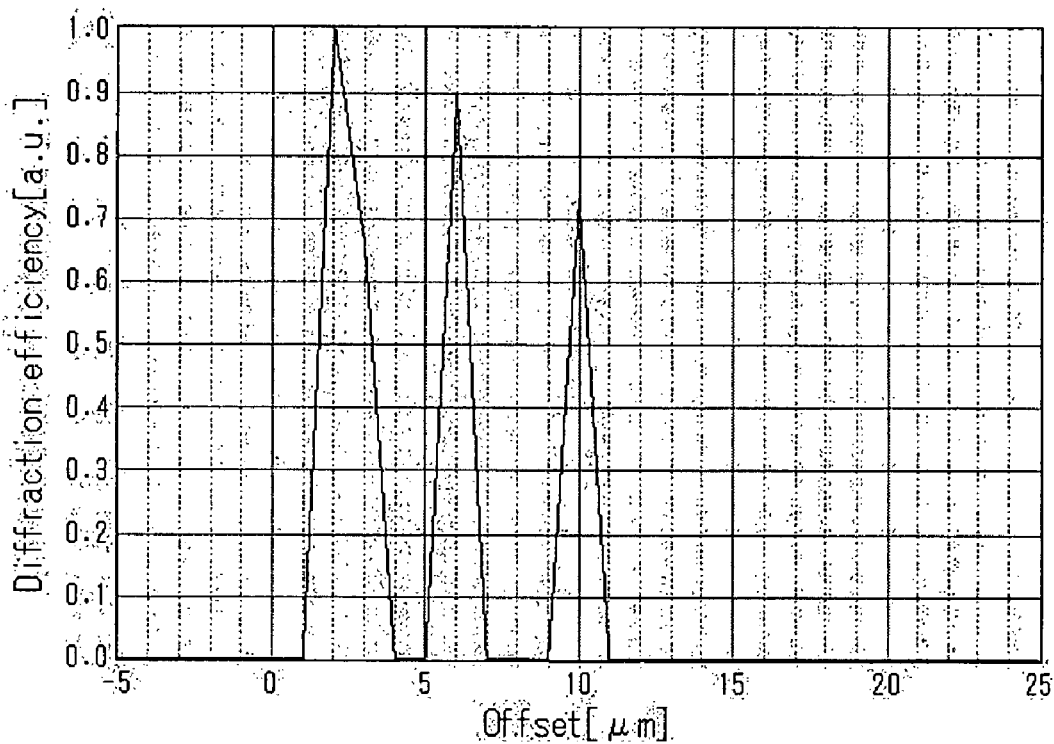
FIG. 17 shows multiplex recording (with using the random phase mask) according to reference light beam shifts.

Next, six signals were multiplex-recorded by using the random phase mask. First, the experiment was conducted by setting the recording interval to 4 micrometers and the recording time to 5 seconds for all signals. The results of this experiment are shown in FIG. 17. The shifts of the diffraction efficiency with respect to the horizontal axis of FIG. 17 are considered as errors of the stage controller. From FIG. 17, only three peaks appear, so that all data cannot be readout in this state. This is due to the action of the erasing effect when multiplex-recording.

Figure 18:
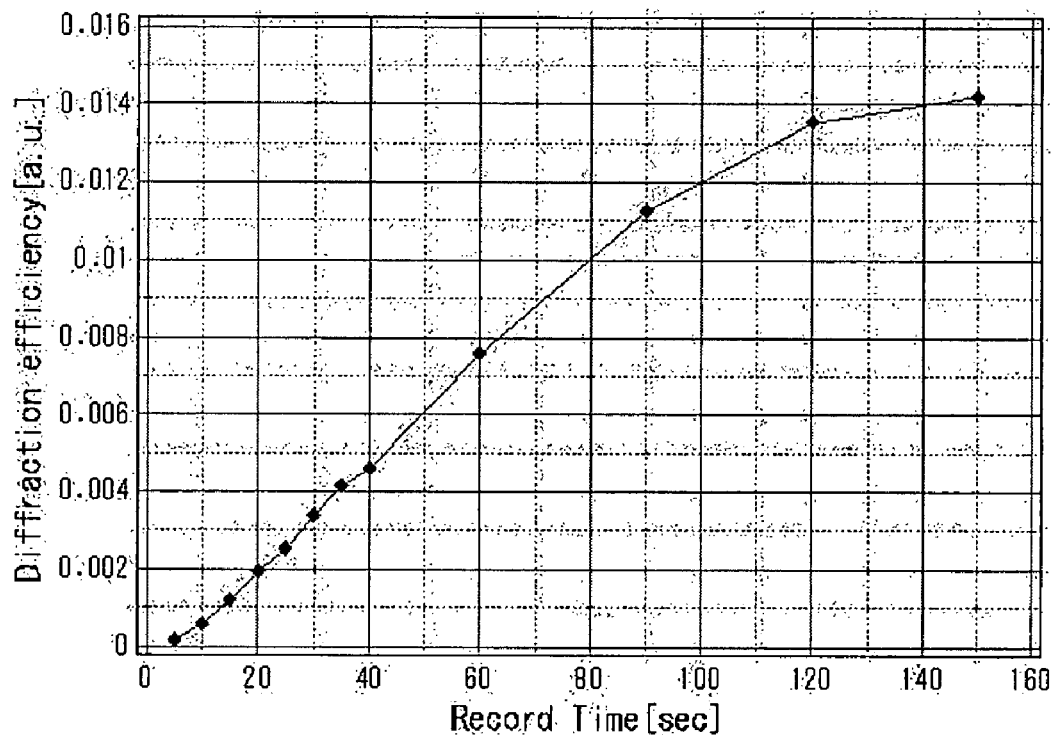
FIG. 18 shows changes in diffraction efficiency with respect to recording times.

Herein, in order to read-out all signals, scheduling recording is introduced. Scheduling recording is a recording method for making even the intensities of the reproduced light beams of the respective signals obtained after multiplex-recording by individually adjusting the recording time for each signal. Herein, the diffraction efficiency change with respect to the recording time is shown in FIG. 18. From FIG. 18, it is understood that the diffraction efficiency increases substantially linearly until 90 seconds with respect to the recording time, and thereafter, it changes to a gradual increase. Therefore, in order to read-out all signals, the recording time is adjusted so that the recording time of a signal to be recorded first which is easily subjected to the erasing effect is set to be maximum, and the recording time becomes shorter in order from it, and the recording time for the signal to be recorded last is made minimum, and as a result, the intensities of the reproduced light of the respective signals can be made even.

Figure 19:
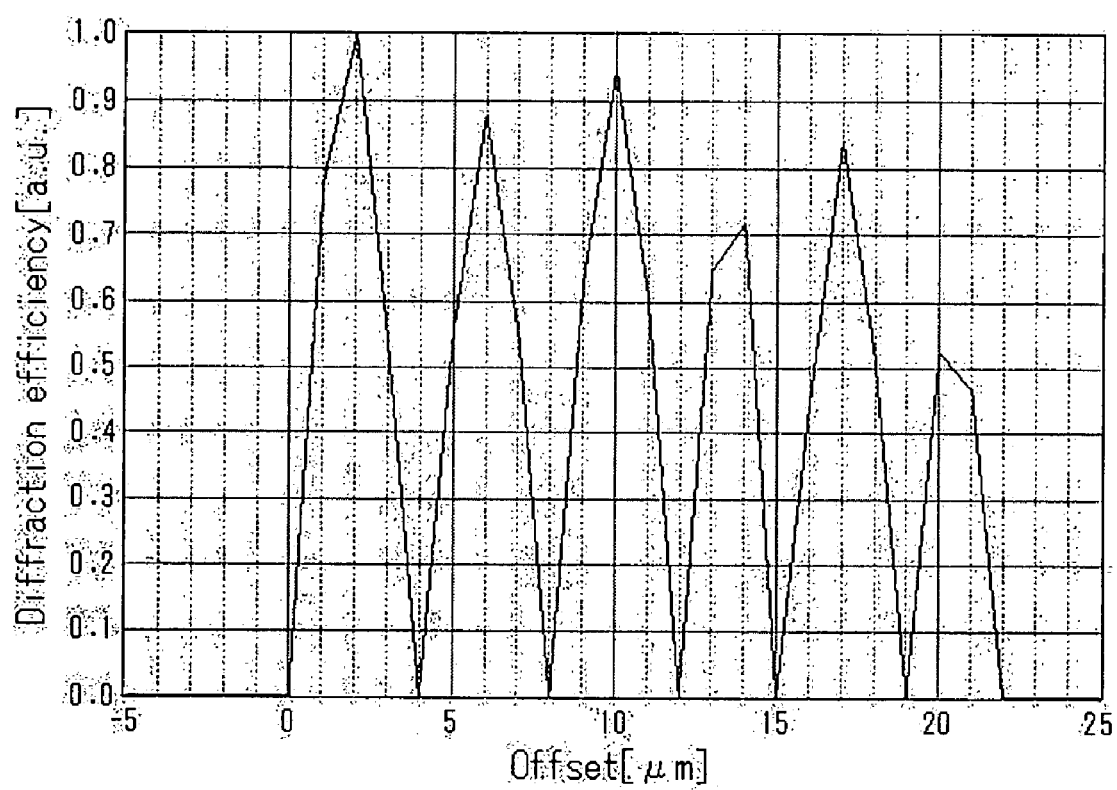
FIG. 19 shows multiplex recording by means of scheduling (with using the random phase mask)

Six signals are multiplex-recorded by means of scheduling by setting the recording interval to 4 micrometers and using the random phase mask in the same manner as described above. Herein, the experiment was conducted by setting the recording time to, in order from the signal to be recorded first, 15 seconds, 13 seconds, 11 seconds, 9 seconds, 7 seconds, and 7 seconds. The results of this experiment are shown in FIG. 19. From FIG. 19, six diffraction efficiency peaks appear, so that it is understood that all data can be independently read-out. The diffraction efficiency peaks corresponding to the respective signals are 0.0298%, 0.0262%, 0.0283%, 0.0214%, 0.0250%, and 0.0156% in order from the left side of FIG. 19. The same experiment was conducted by setting the recording interval to 2 micrometers, however, the diffraction efficiency peaks overlap, and independent data reading could not be performed. From this fact, it is understood that by performing scheduling recording by using the random phase mask, multiplex recording can be performed by setting the recording interval to 4 micrometers in the optical system of this Example 7.

EXAMPLE 8

Reproduced Images and Bit Error Rate

Figure 20:
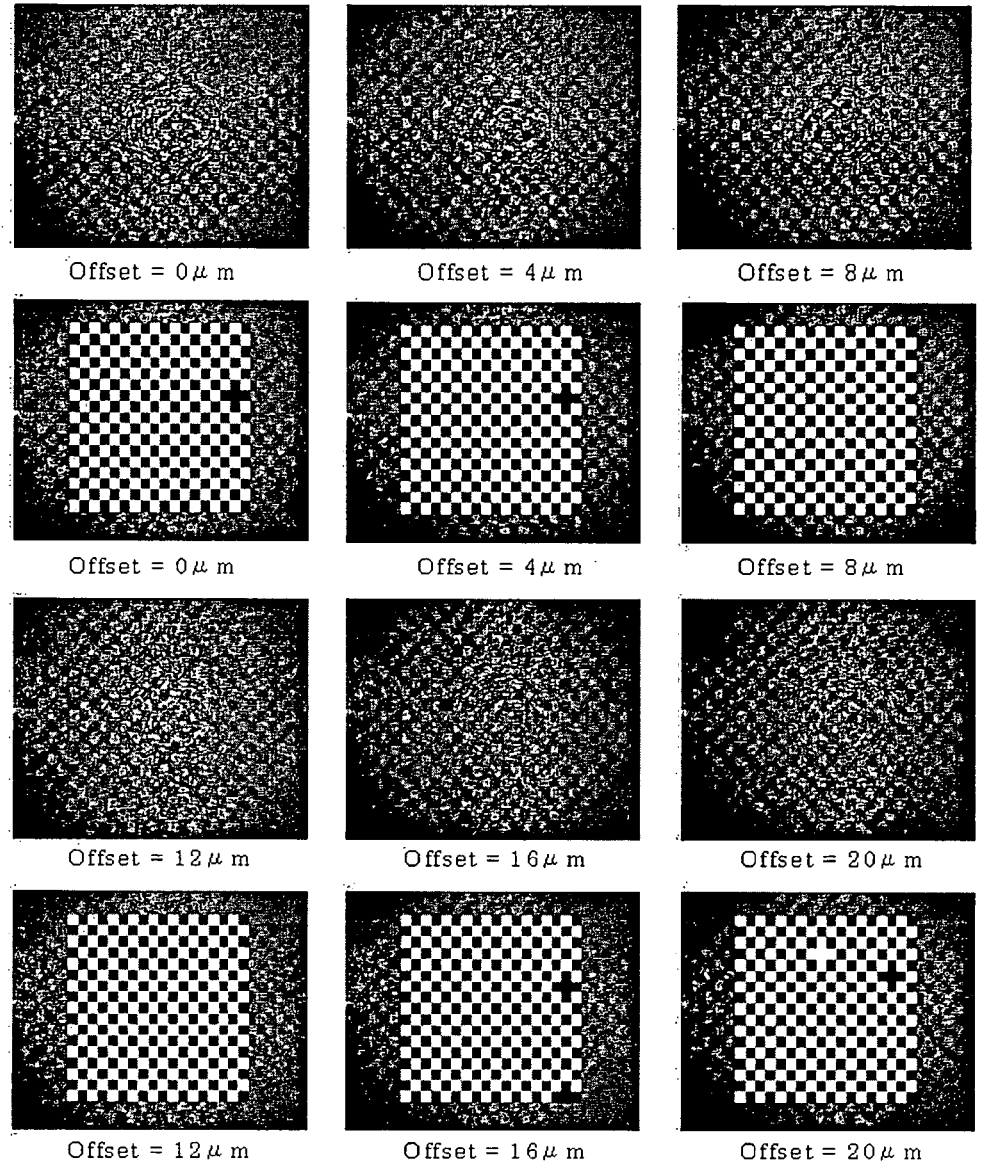
FIG. 20 show reproduced images and recognized images when performing multiplex recording by means of scheduling using the random phase mask.

In this Example 8, a bit error rate with respect to reproduced images when bit data is carried on a signal light beam and multiplex-recorded by means of scheduling by using the random phase mask is evaluated. By setting the recording interval to 4 micrometers and setting the recording time to, in order from the signal to be recorded first, 15 seconds, 13 seconds, 11, seconds, 9 seconds, 7 seconds, and 7 seconds as in the description of the previous paragraph, an experiment was conducted. Reproduced images and recognized images in this experiment are shown in FIGS. 20(1) through 20(12). The image size is 500×480 (pixels), the total number of bits to be handled as data is 18×17 (bits), and a block size of one bit is 17×22 (pixels).

From FIG. 20, it is understood that the brightnesses of the reproduced images are substantially close to each other in varying degrees. As in the case of Example 5, the bit recognition processing herein is for judging whether the brightness of each block is 1 or 0 by locally comparing the brightnesses between adjacent blocks by defining a total brightnesses of pixels included in each block as the brightness of each block. As a result of bit recognition processing, the bit error rates of the reproduced images were, in increasing order of the offset, 0.33%, 0.33%, 0.00%, 0.00%, 0.65%, and 0.33%.

Herein, the bit error rates of some reproduced images do not completely drop to 0.00%, and the cause for this is considered that, when the reference light beam was made incident on the objective lens placed immediately before the recording medium, it was surface-reflected and appeared in the reproduced images as a noise. That is, it is considered that, by eliminating the surface-reflected light beam, the bit error rate can be made close to 0.00%. The measurement results of this Example 8 has proven that even when bit images were carried on a signal light beam, they could be multiplex-recorded at intervals of 4 micrometers by performing scheduling recording by using the random phase mask.

EXAMPLE 9

Encryption Using Random Phase Mask

This Example 9 shows that encryption can be performed by using the random phase mask in the reflection holographic memory. As encryption, two methods for encrypting the signal light beam and encrypting the reference light beam are available, however, the method for encrypting the reference light beam is performed in this Example 9. The optical system in Example 9 has the same construction as that of Example 5 (see FIG. 10).

In the construction of the optical system of FIG. 10, the reference light beam is encrypted by passing through the random phase mask, and passes through the lens and enters from a direction opposite the signal light beam, and is recorded in the form of reflection. When reading, only when the random phase mask key is the same as in the case of recording, signals are reproduced by the reference light beam and the reproduced images are taken into the CCD camera, and subjected to bit recognition processing in a personal computer (PC).

Figure 21:
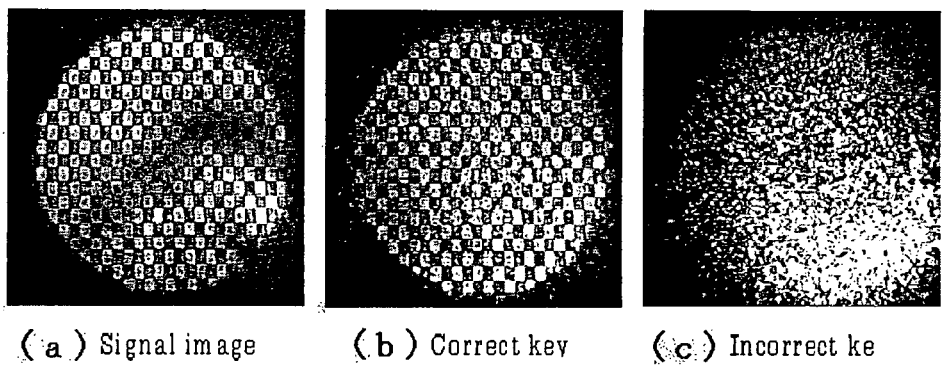
FIG. 21 show reproduced images subjected to encryption by using the random phase mask.

In this Example 9, a signal image indicated on the spatial light modulator is shown in FIG. 21(a). Reproduced images when the random phase mask key is correct and when the random phase mask is slightly shifted and the key is different are shown in FIG. 21(b) and FIG. 21(c), respectively. The image sizes thereof are all 400×380 (pixels). From FIG. 21(a) through FIG. 21(c), it is understood that the recorded signal image is correctly reproduced when the random phase mask key is correct. On the other hand, when the key is different, an image greatly different from the recorded signal image is reproduced, and it is considered that the original signal image cannot be supposed from this different image, so that the encryption effect can be obtained by the random phase mask.
Recording Capacity)

In Example 7, the minimum recording interval for multiplex recording could be determined, so that the recording capacity is easily evaluated. First, when assuming that the shape of the recording medium is a 5-inch disk, in the case of multiplex recording by means of scheduling using the random phase mask, when the recording interval is 4 micrometers, the distance between the centers of adjacent signals is 4 micrometers, so that when the spot radius of one signal is 2 micrometers, the number of signals allowed to be recorded on the 5-inch disk is obtained from the following Equation 1.

$$\pi(6.25\times10^{-2})^2/\pi(2\times10^{-6})^2 \approx 9.77\times10^8 \quad \text{[Equation 1]}$$

Herein, when assuming bit data to be carried on one signal was 18×17=306 (bits) as in Example 8, a recording density of 24.4 bits/μm² was realized in terms of in-plane recording density. An approximate value of the whole recording capacity can be calculated from the following Equation 2.

$$306\times9.77\times10^8 = 299.0 \text{ [Gbit]} = 37.4 \text{ [Gbyte]} \quad \text{[Equation 2]}$$

In normal multiplex recording, the recording interval is 22 micrometers, so that the recording capacity is 1.615 (Gigabytes) through the same calculation. This result shows that the recording capacity could be increased to about 30 times by performing multiplex recording by means of scheduling by using the random phase mask.

Improvement in recording data density is possible by increasing the density of page images. When assuming bit data to be carried on one signal is 100×100=10000 (bits), an approximate value of the whole recording capacity can be calculated from the following Equation 3. Thereby, recording of about 5 terabytes on a 5-inch recording medium can be expected.

$$10000\times9.77\times10^8 = 9.77\times10^{12} \text{ (bit)} \approx 1.22 \text{ (Tbyte)} \quad \text{[Equation 3]}$$

Herein, specifications of the devices used in the above-described examples are described.

Ar (argon ion) laser (manufactured by Coherent, type: Innova300)
CCD sensor (manufactured by Sony, type: XC-77)
Input spatial light modulator (manufactured by Holoeye, type: LC-2002)
Lens (manufactured by PENTAX, smc: 50 mm)
Objective lens (manufactured by Mitutoyo, M Plan Apo SL20)

EXAMPLE 10

In the reflection holographic memory device with the construction of the present invention, by a simulator program which simulates a signal light beam converged by a condenser lens and diffracted light beams obtained from a reference light beam coaxially opposed to the signal light beam and converged, conditions of an optical system which can further improve the recording capacity could be obtained, and this will be described hereinafter.

First, the reflection holographic memory simulator program will be described.

The reflection holographic memory simulator program includes the steps of: spatially propagating a signal light beam and a reference light beam, dividing these into plane waves with different angles, calculating a complex amplitude distribution of a reading light beam with respect to a refractive index distribution formed by each plane wave according to Kogelnik's coupled-wave theory, adding the complex amplitudes of diffracted light beams propagating in the same direction, and calculating phase shift with respect to each plane wave component caused by the mechanism for operating the optical pick-up system.

Generally, Kogelnik's coupled-wave theory for analyzing a hologram is a method for calculating diffracted light beams from a sine volume hologram when the signal light beam and the reference light beam are formed into plane waves, and in the optical system of the reflection holographic memory device according to the present invention, a lens is placed immediately before the recording medium to converge the signal light beam and the reference light beam as converged waves, so that to calculate the diffraction efficiency in the reflection shift multiplex holographic memory by using the coupled-wave theory, the coupled-wave theory is expanded to converged waves.

That is, in the reflection holographic memory simulator program, the converged light beams are divided into plane waves with different angles, the complex amplitude distribution of a reading light beam with respect to the refractive index distribution formed by each plane wave is calculated according to Kogelnik's coupled wave theory, and complex amplitudes of diffracted light beams propagating in the same direction are added, whereby the diffracted light beams are obtained.

Figure 26:
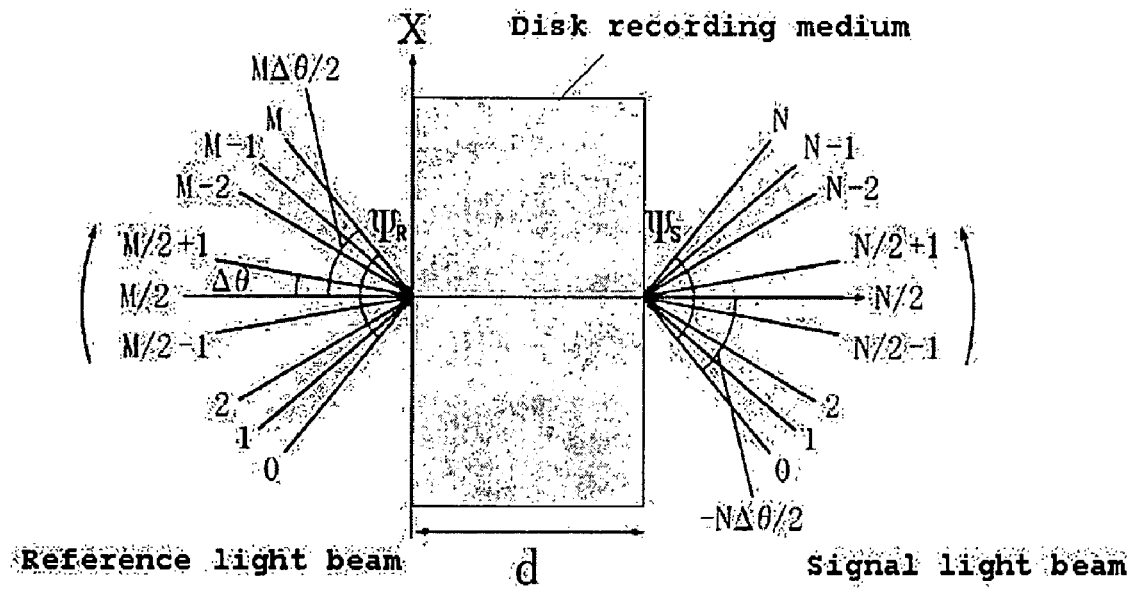
FIG. 26 is a schematic view of division of the signal light beam and the reference light beam in a simulator program.

FIG. 26 shows a schematic view of division of the signal light beam and the reference light beam in the simulator program. Herein, d denotes the thickness of the disk recording medium. Δθ denotes a step angle.

Figure 27:
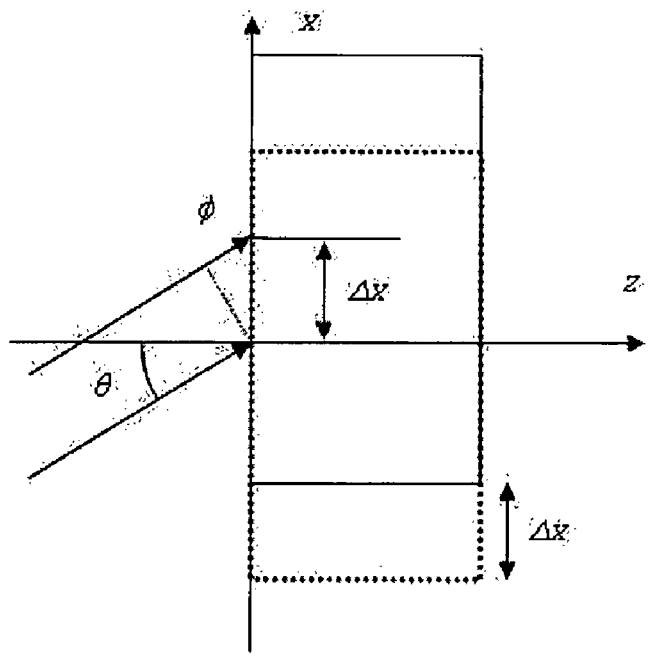
FIG. 27 is a diagram showing a phase difference caused by a positional shift of the recording position of the disk recording medium.
Figure 28:
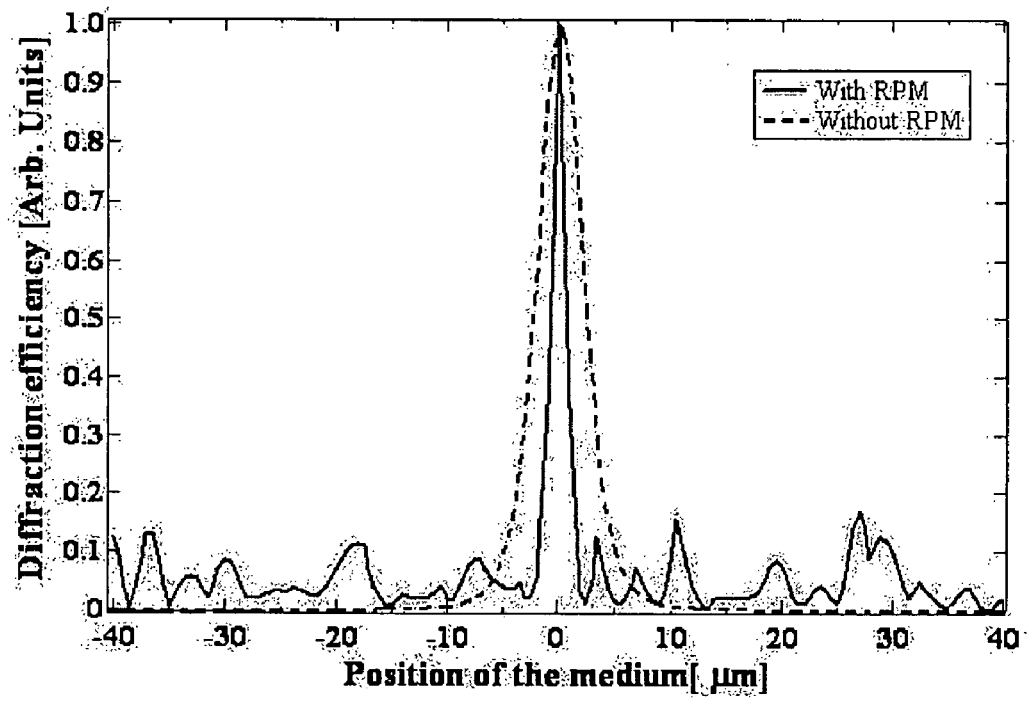
FIG. 28 is a graph showing shift dependencies of the diffraction efficiency when random phase modulation calculated by using the simulator program is applied and when the random phase modulation is not applied.

This simulator program is also used for simulation of spatial shift multiplex recording. Therefore, phase shift with respect to each plane wave caused by movement of the disk recording medium is considered. FIG. 27 shows phase difference caused by positional shift of the recording position of the disk recording medium. As shown in FIG. 27, concerning a reading reference light beam with a wavelength λ to enter the recording medium at an angle θ, a phase delay amount θ caused by shift by Δx of the recording position of the disk recording medium is expressed by the following Equation 4.

$$\phi = \frac{2\pi\Delta x}{\lambda}\sin\theta \quad \text{Equation 4}$$

The phase delay amount φ differs depending on the angle of the plane wave, so that the phases of the plane wave diffracted light beams through the hologram are different. With the same phase, the waves intensify each other, and in opposite phase, the waves cancel each other. It is understood that as the angle θ increases more than Equation 4, the phase delay amount Φ becomes larger.

By comparing a diffraction efficiency value calculated by the simulator program and a value obtained in actual experiment results, the appropriateness of the simulator program was evaluated. Herein, the number of divisions of plane waves was set to 200, and the step angle was set to 0.1 degrees.

According to the simulator program, the full width at half maximum of the diffraction efficiency was 1.5 micrometers when the random phase mask was used and 4.9 micrometers when the random phase mask was not used, and the diffraction efficiencies were $8.0\times10^{-3}$ and $2.5\times10^{-3}$, respectively. As parameters in these cases, the maximum refractive index change is $3.35\times10^{-4}$, and the effective numerical aperture is 0.05. On the other hand, according to the results of experiment, when using the random phase mask and when not using the random phase mask, the full widths at half maximum were 10 μm and 4.9 μm and the diffraction efficiencies were $8.0\times10^{-3}$, $2.5\times10^{-3}$, respectively. By comparing these, the full widths at half maximum of the diffraction efficiencies show substantially the same values, and the diffraction efficiencies are the same between the experiment results and the value calculation results From this fact, it is understood that the value calculation results obtained by the simulator program and the experiment results desirably match each other. Based on the values of parameters obtained in the value calculation results by this simulator program, the optical system can be optimized and the recording capacity can be improved. As detailed parameters, the wavelengths and numerical apertures of the signal light beam and the reference light beam are changed, whereby the recording capacity can be increased.

Figure 29:
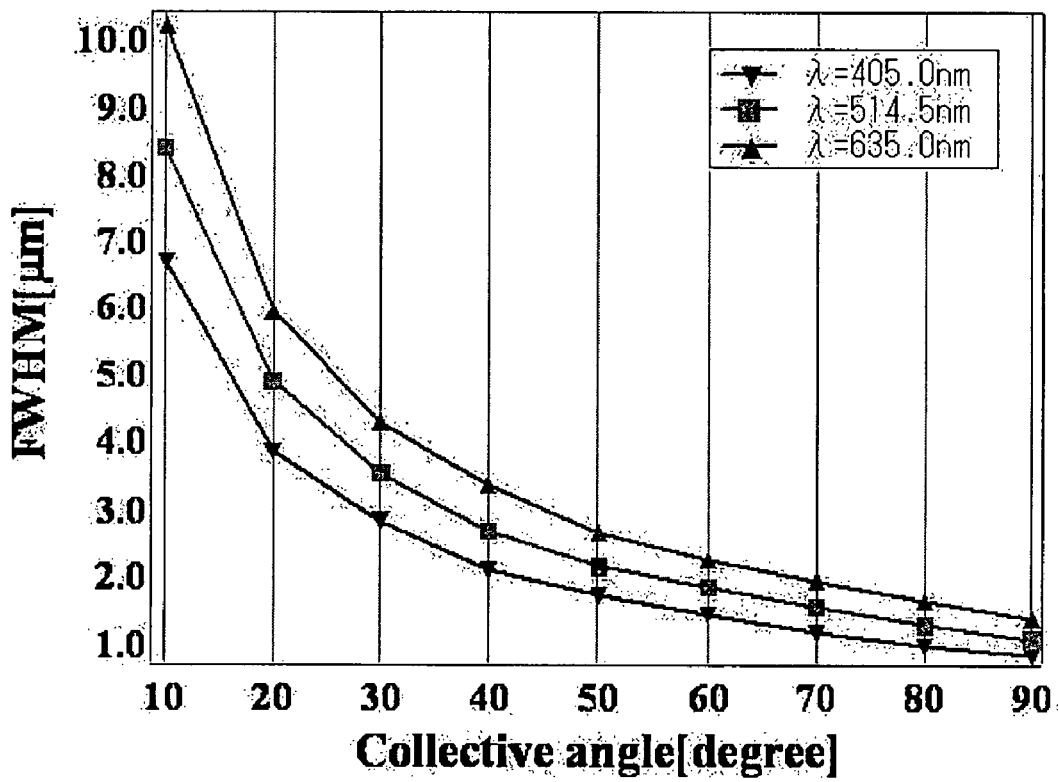
FIG. 29 is a graph showing full widths at half maximum of the diffraction efficiencies with respect to converting angles at three light source wavelengths.

FIG. 29 shows the results of analysis by this simulator program about the changes in full width at half maximum of the diffraction efficiency with respect to the converging angle when changing the wavelength of the light source to 514.5 nanometers as a wavelength of the argon ion laser used in the experiment, 405 nanometers as a wavelength of a blue-violet laser to be used in the Blu-ray Disc and HD-DVD, and 635 nanometers near the wavelength of a red laser to be used in a DVD. The full widths at half maximum with respect to the respective wavelengths when the converging angle is 90 degrees become 1.4 micrometers, 1.1 micrometers, and 0.8 micrometers, so that it is understood that the full width at half maximum of the diffraction efficiency becomes smaller as the wavelength becomes shorter.

Figure 30:
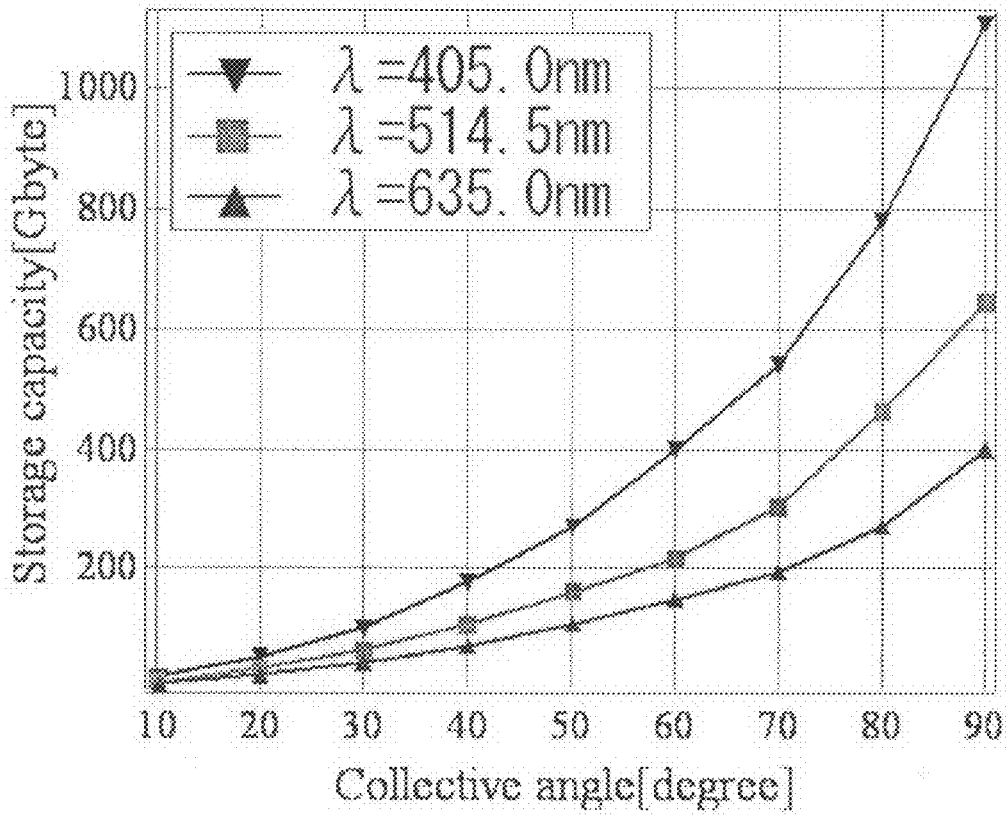
FIG. 30 is a graph showing converging angle dependencies of the recording capacity of the reflection holographic memory at three light source wavelengths.

Herein, changes in recording capacity with respect to the converging angle when setting this full width at half maximum as a recording interval, the page data to 20×20=400 bits, and using a 5-inch disk as the recording medium are shown in FIG. 30. It is shown in FIG. 30 that the recording capacity with respect to the converging angle increases as the wavelength becomes smaller. The recording capacities with respect to the respective wavelengths when the converging angle is 90 degrees are, in decreasing order of the wavelength, 398.6 Gigabytes, 645.7 Gigabytes, and 1107.2 Gigabytes.

When the wavelength is 405 nanometers and the converging angle is 90 degrees, on the simulation, the recording capacity exceeds 1 Terabyte, and this shows the possibility that the reflection shift multiplex holographic memory has a recording capacity of 1 Terabyte. When the converging angle is 90 degrees at the wavelength of 405 nanometers, the recording density is 721.8 bits/$\mu m^2$. This recording density corresponds to three-dimensional volume recording of 92.5 layers based on the fact that the recording density according to the in-plane diffraction limit is 7.8 bits/$\mu m^2$ when the wavelength is 405 nanometers. From this result, it is understood that the recording capacity of the reflection shift multiplex holographic memory can be improved by shortening the laser wavelength and increasing the converging angle.

EXAMPLE 11

This example shows the results of actual simulation performed according to the above-described simulation program.

This simulation shows that the reflection holographic memory system is higher in performance than the transmission holographic memory under the same conditions of the signal light beam, reference light beam, reading light beam, and recording material. As a hologram multiplexing recording method, spherical reference wave spatial shift multiplex recording is used. Generally, in performance evaluation of holographic memories, a spatial modulated pattern must be used as the signal light beam, and a bit error rate (bit recognition error rate) is available as an index of data reproduction, however, in this simulation, numerical value calculation results as evaluation of the diffraction efficiency and bit error rate by using binary signal sequences are shown, and furthermore, analysis using real signals in the reflection hologram is performed.

Hereinafter, the numerical value calculation results as evaluation of the diffraction efficiency and the bit error rate and the results of analysis using real signals in the reflection hologram are described.

Figure 31:
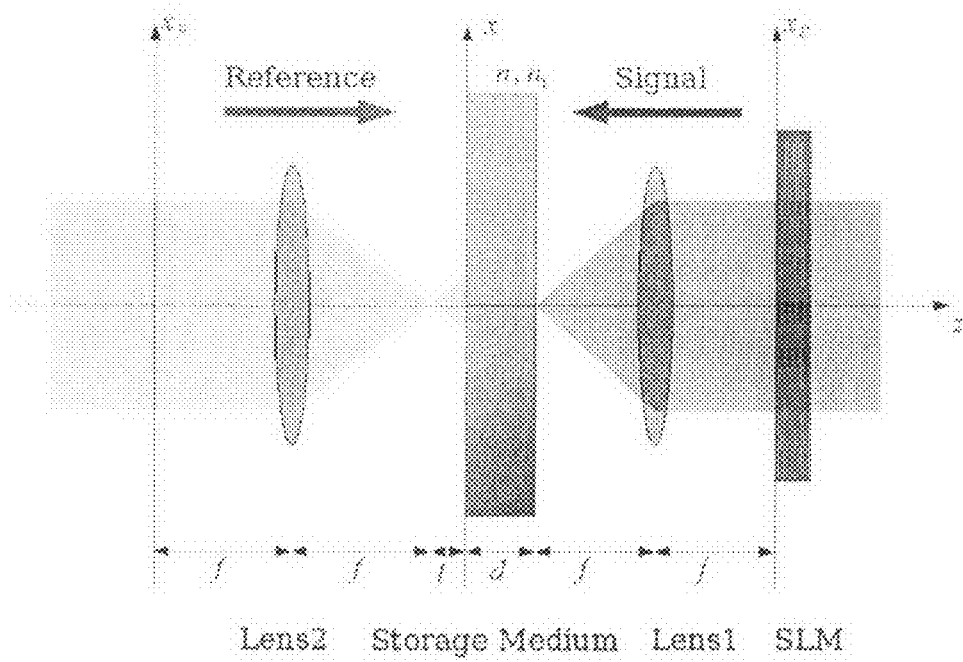
FIG. 31 is an analyzing system construction view of the reflection holographic memory (Lens 1, 2: Fourier transform lens, SLM: spatial light modulator)

Hereinafter, as a comparison of holographic memory systems in which a signal light beam and a reference light beam coaxially propagate, performances of a transmission hologram and a reflection hologram are compared through a simulation. In the simulation, the two-dimensional space as shown in FIG. 31 is used, and as a multiplex recording method, spherical reference wave spatial shift multiplex recording is used. As a signal light beam, binary data of 50 bits is used. The signal value "1" has an amplitude distribution as a gauss distribution of the full width at half maximum of 20 micrometers. The reference light beam and the reading light beam have an amplitude distribution as a gauss distribution of the full width at half maximum of 800 micrometers. As analysis conditions, a wavelength of 514.5 nanometers, a focal length f=7.348 mm of the lens, a refractive index n=2.2 of the recording medium, a maximum refractive index change $n_1=10^{-6}$, and a thickness d=0.5 mm of the recording medium were set. By introducing a defocus amount l in the reference light beam, the overlap of the signal light beam and the reference light beam on the recording surface is adjusted. The size of the signal light beam on the input surface is 3.5 mm, and this region is divided into 4096 points. For calculating propagation of the signal light beam, reference light beam, and reading light beam to the hologram surface, the Fresnel propagation calculation is used, and for diffraction calculation in the hologram, Kogelnik's coupled-wave theory is used. For calculating spatial propagation from the hologram to the image sensor surface, the Fresnel propagation calculation is used. In order to perform spatial shift multiplex recording by numerical value calculation, the phase shifts of the plane wave components caused by movement of the recording material are introduced.

Figure 32:
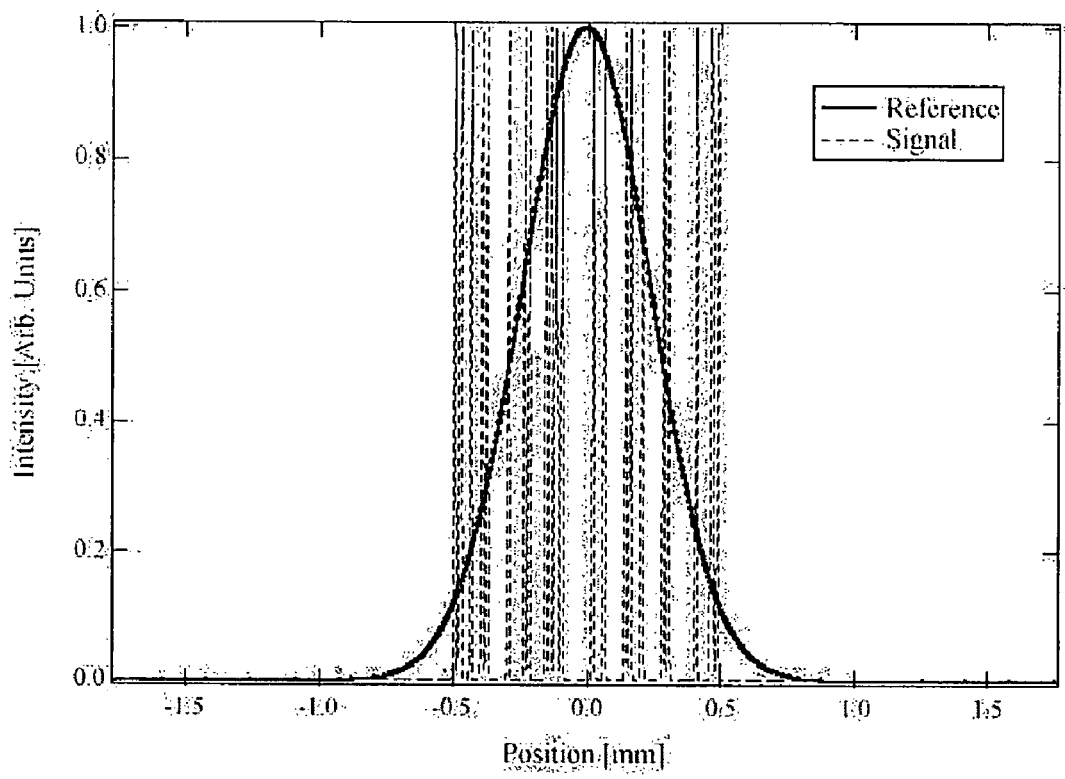
FIG. 32 is a graph showing intensity distributions of the signal light beam and the reference light beam on the incident surface.

FIG. 32 shows intensity distributions of the signal light beam and the reference light beam. In FIG. 32, the solid line shows the signal light beam intensity distribution, and the dotted line shows the reference light beam intensity distribution. The recording surface is a Fourier transform plane for the signal light beam and the reference light beam when the defocus amount l=0 on the reference light beam side, so that the beam diameter of a reference light beam that is not spatially modulated narrows. Therefore, the overlap of the signal light beam and the reference light beam becomes small on the recording surface. In this case, a reproduced signal light beam lacks a high-frequency component, so that a bit error occurs in the reproduced signal. When the defocus amount is adjusted and the overlap of the signal light beam and the reference light beam increases, the signal light beam can be sufficiently recorded, so that the bit error rate of the reproduced signal can be made small.

Figure 33:
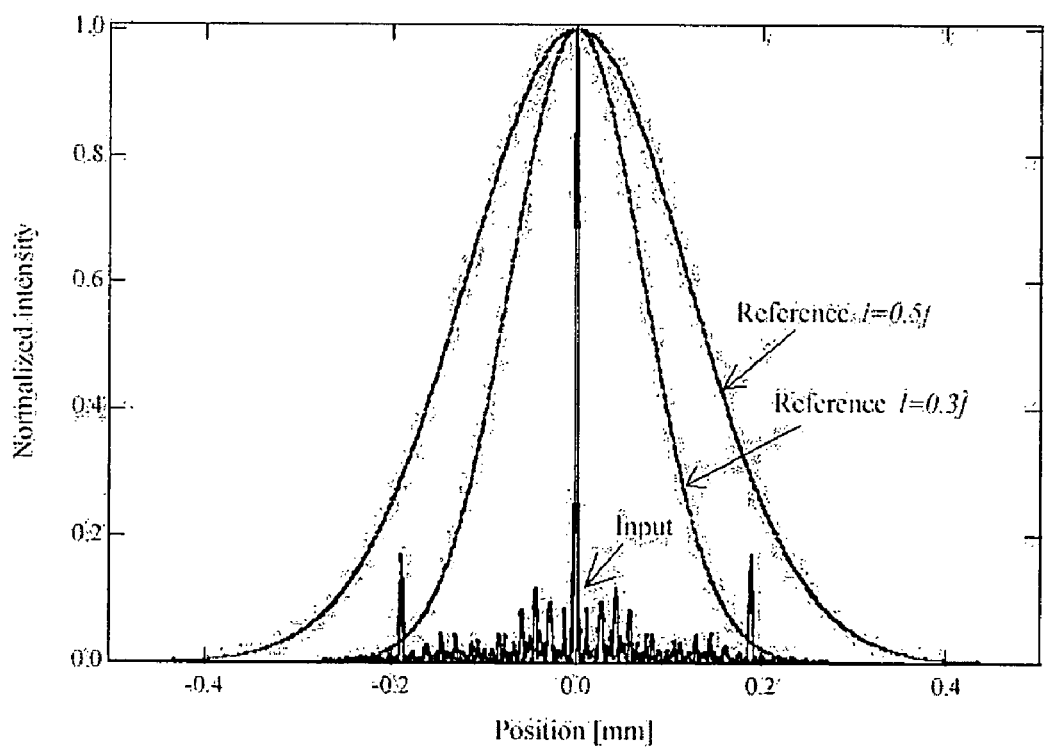
FIG. 33 is a graph showing intensity distributions of the signal light beam and the reference light beam on the recording medium surface.

FIG. 33 shows a waveform of the reference light beam when the defocus amount l is changed. From FIG. 33, it is understood that when l=0.3 f or 0.5 f, the reference light beam intensity distribution is equivalent to or larger than the spread of the signal light beam.

Figure 34:
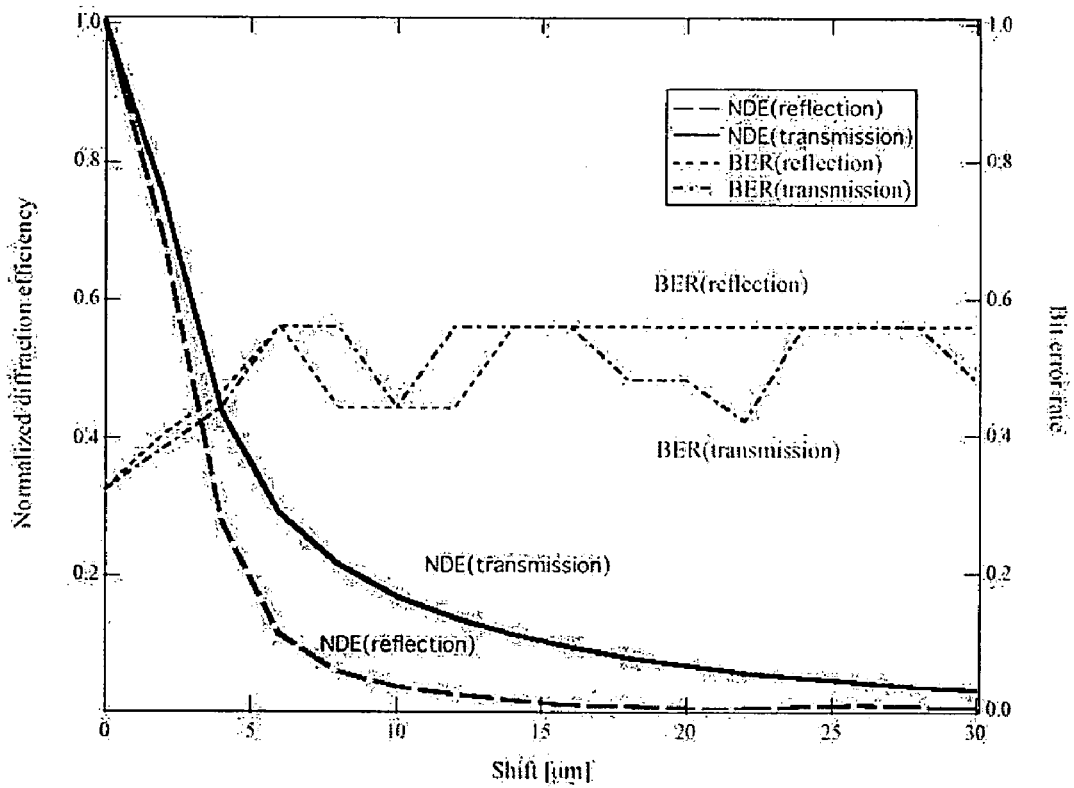
FIG. 34 is a graph showing the shift selectivity of the diffraction efficiency and the bit error rate when the defocus amount of the reference light beam is l=0.0.
Figure 35:
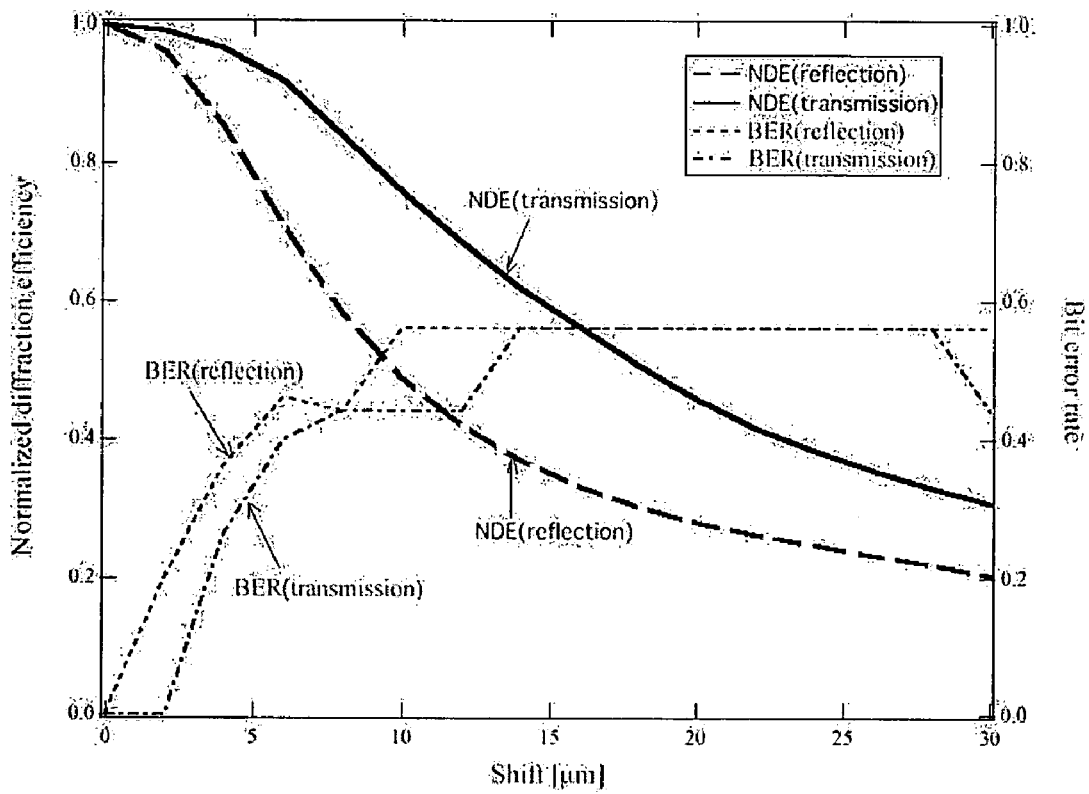
FIG. 35 is a graph showing shift selectivity of diffraction efficiency and the bit error rate when the defocus amount of the reference light beam is l=0.3f.
Figure 36:
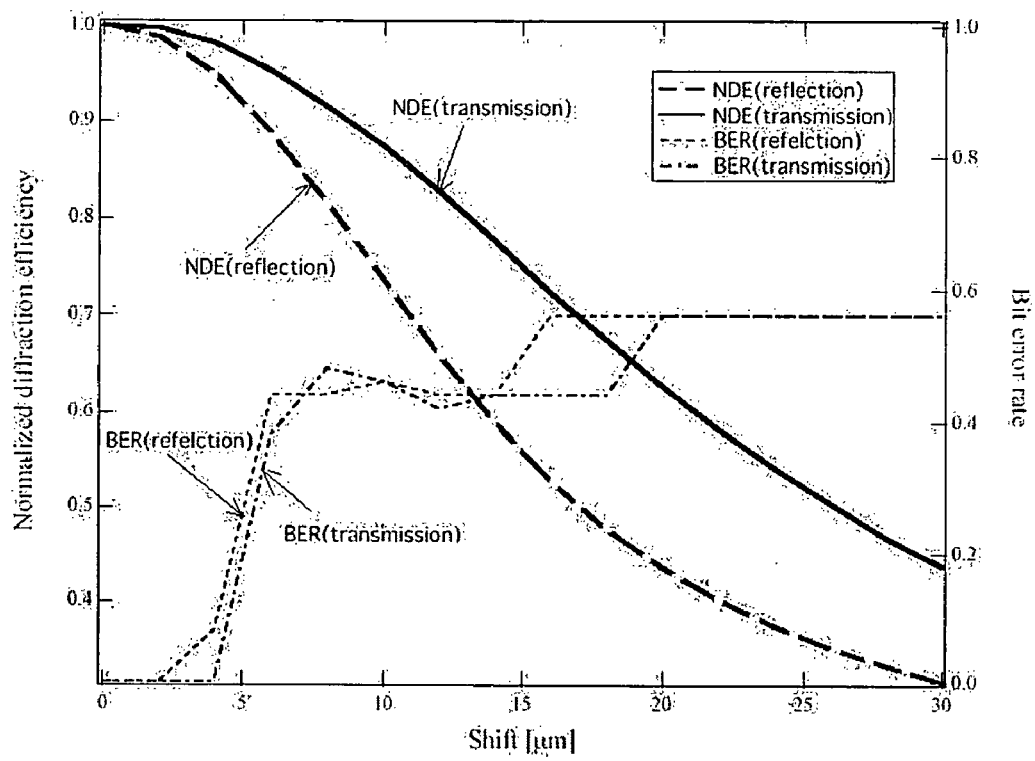
FIG. 36 is a graph showing shift selectivity of diffraction efficiency and the bit error rate when the defocus amount of the reference light beam is l=0.5f.

The results of investigation on the shift selectivity of the diffraction efficiency and the bit error rate by changing the defocus amount are shown in FIG. 34, FIG. 35, and FIG. 36. FIG. 34, FIG. 35, and FIG. 36 are the results when the defocus amount l=0, 0.3 f, and 0.5 f, respectively. From FIG. 34, FIG. 35, and FIG. 36, it is understood that the reflection hologram has shift selectivity higher than in the transmission hologram since the diffraction efficiency attenuates earlier. It is also understood that the reflection hologram has data reading selectivity higher than in the transmission hologram since a bit error occurs with a smaller shift amount.

Figure 37:
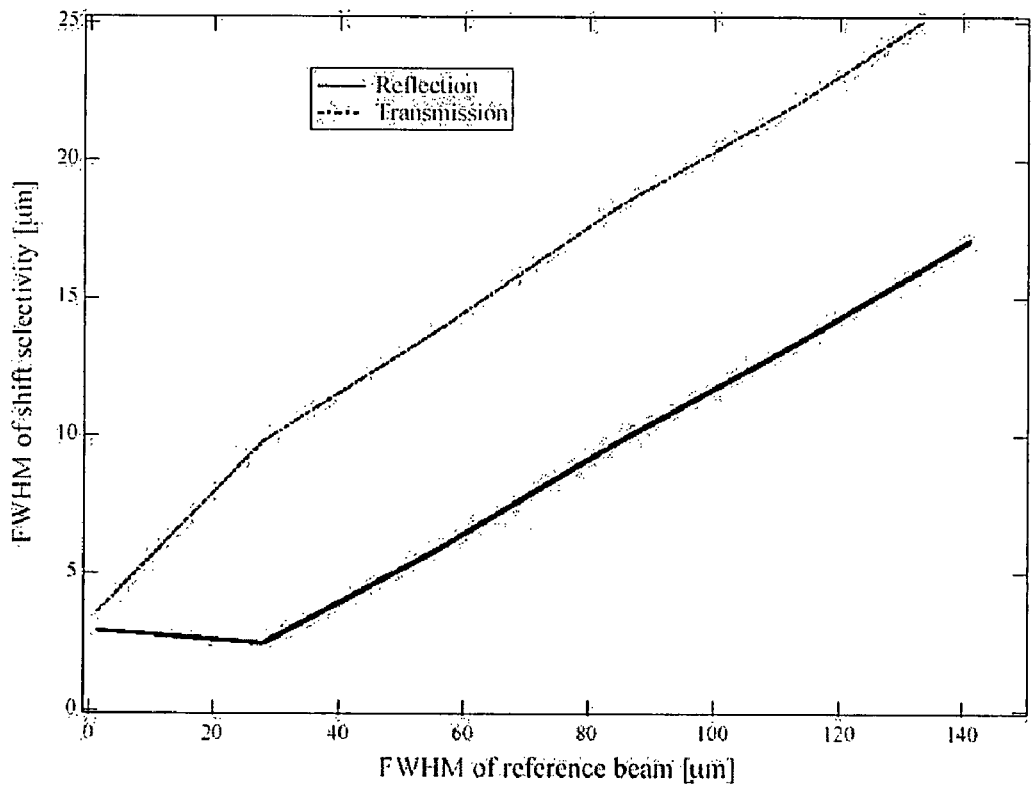
FIG. 37 is a graph showing an influence of the beam diameter on the recording surface on the shift selectivity.

Next, FIG. 37 shows the results of comparison in shift selectivity of the diffraction efficiency between the reflection hologram and the transmission hologram with respect to the beam diameter of the reference light beam. Herein, the shift selectivity is judged based on the shift amount when the diffraction efficiency is reduced from the maximum to half. From FIG. 37, it is understood that the diffraction efficiency is reduced with a smaller shift amount in the reflection hologram than in the transmission hologram. Therefore, the reflection hologram can be improved in recording density more than in the transmission hologram even when the same optical system and the same recording material are used.

For example, when the reference light beam diameter on the recording surface is 84.7 micrometers, the shift amount of the reflection hologram is 9.7 micrometers, and the shift amount of the transmission hologram is 18.3 micrometers. Therefore, it becomes possible to improve the recording capacity to about 1.89 times uniaxially. The reason for this is that the canceling effect according to multiple beam interference is improved.

In the reflection hologram, the angle Bragg selectivity is weak, so that diffraction of plane waves with an incident angle different from that at the time of recording becomes great. Therefore, multiple beam interference easily occurs. It is considered that, due to the movement of the material, phase shifts depending on the incident angles occur in the respective plane wave components, and the shifts act in the direction of canceling each other in the interference. From FIG. 37, it is also understood that shift multiplex recording is possible since the diffraction efficiency lowers with a shift amount sufficiently smaller than the reference light beam diameter.

Figure 38:
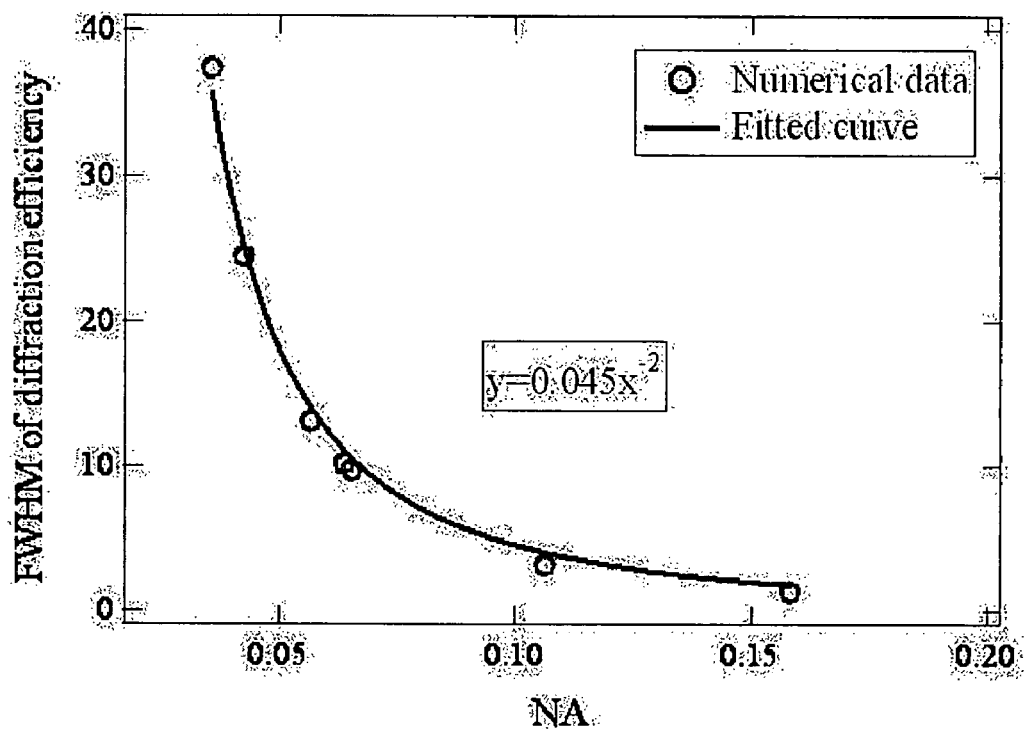
FIG. 38 is a graph showing changes in shift selectivity of the diffraction efficiency with respect to the lens effective numerical aperture (NA); and, FIG. 39 is a graph showing a comparison in shift selectivity (l=0.3f) when the random phase modulation is applied and when the random phase modulation is not applied.

The results of investigation on changes in width of the shift selectivity with respect to the lens numerical aperture (NA) are shown in FIG. 38. FIG. 38 shows results of investigation on the shift selectivity of the diffraction efficiency when the effective NA is changed by changing the reference light beam diameter. From FIG. 38, it is understood that the shift selectivity of the diffraction efficiency is reduced in inverse proportion to a square of the lens numerical aperture (NA). Herein, the shift selective distance is defined as a movement amount of a position at which the diffraction efficiency becomes half the maximum value due to movement of the position of the material, however, from FIG. 38, it is understood that the shift selective distance is $d=a/(NA^2)$ provided that a denotes a constant.

Figure 39:
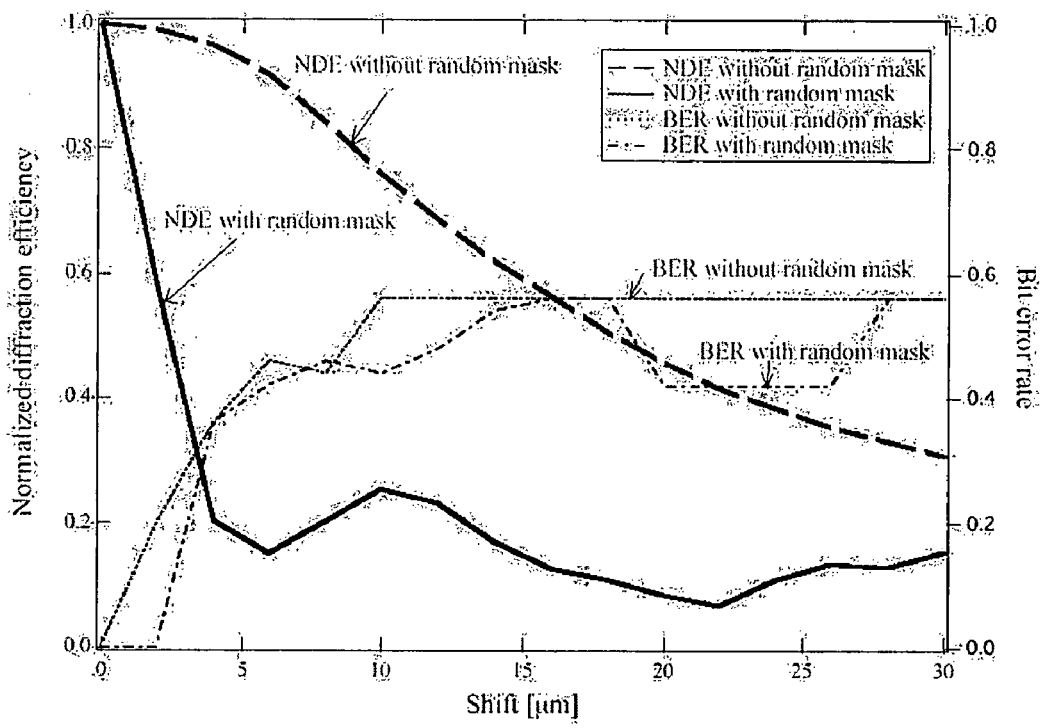

Next, results of investigation on the shift selectivity when the random phase modulation is introduced are shown in FIG. 39. From FIG. 39, it is understood that the shift selectivity is greatly improved by introducing the random phase modulation.

Therefore, it is verified in this simulation that the recording density can be improved by the random phase modulation. The reason for this is that plane waves with great angles are generated due to dispersion of the Fourier spectrum according to the random phase modulation, so that the canceling effect according to multiple beam interference increases.

The reflection holographic memory of the present invention can be used as a high-capacity data recording device which uses a disk recording medium, and is compatible with existing optical pickup techniques, and realizes high-speed data reading and parallel reading of image data. In addition, it can also be used as a large-scale information security device by employing encryption using a random phase mask.

DESCRIPTION OF THE REFERENCE NUMERALS

1 Disk recording medium
2 Input image data
3 Random phase mask
4 Polarization beam splitter
5 Quarter wavelength plate
6 Mirror
7 Condenser lens
8 Image sensor
9 Signal light beam
10 Reference light beam
ND: Neutral density
HWP: Half wave plate
P: Polarizer
M1, M2, M3: Mirror
SLM: Spatial light modulator
PRM: Random phase mask
LN: LiNbO3; Fe
MS: Movable stage
PC: Personal computer
CCD: Charge coupled device

The invention claimed is:

1. A reflection holographic memory device as a holographic recording and reproducing system which records binary image data as a light interference pattern by irradiating a holographic memory recording medium with a signal light beam and a reference light beam, and reproduces the data from a reproduced image obtained by irradiating the holographic memory recording medium with a reference light beam, wherein the holographic memory recording medium is a disk recording medium, and the device increases recording capacity of a reflection hologram, the device comprising:
   a mechanism for operating an optical pick-up system;
   a system for aligning polarization planes of the signal light beam and the reference light beam on the disk recording medium by guiding the signal light beam and the reference light beam so as to be opposed to each other;
   a random-phase modulation multiplex recording means provided in a light guide path of the reference light beam; and
   a spatial-shift multiplex recording means which involves shifting of the reference light beam by using the mechanism for operating the optical pick-up system, wherein
   the system for aligning polarization planes of the signal light beam and the reference light beam on the disk recording medium
   directs coaxially the signal light beam and the reference light beam with linear polarization states, which are different by 90 degrees from each other, the signal light beam and the reference light beam overlapping spatially in the same direction with respect to the recording medium,
   converges the signal light beam and the reference light beam by a condenser lens and irradiates the signal light beam and the reference light beam onto the disk recording medium, after transmitting only the reference light beam through the disk recording medium,
   aligns the polarization state of the reference light beam with that of the signal light beam by using a quarter wavelength plate and a reflecting minor, and
   opposes coaxially the signal light beam and the reference light beam from each other.

2. The reflection holographic memory device according to claim 1, wherein
   a shift selective distance is selected so as to be in inverse proportion to substantially a square of a numerical aperture of the condenser lens in the spatial-shift multiplex recording means.

3. The reflection holographic memory device according to claim 1, wherein the random-phase modulation multiplex recording means uses a random phase mask or a pseudo random phase mask.

4. The reflection holographic memory device according to claim 1, wherein a quarter wavelength plate and a reflecting minor are layered or included as an internal structure in the disk recording medium.

5. The reflection holographic memory device according to claim 1, wherein a scheduling recording means for adjusting a time for recording the signal light beam on the disk recording medium for each signal is provided.

6. The reflection holographic memory device according to claim 1, wherein the random-phase modulation multiplex recording means is used as a light encrypting means and a means for improving recording density.

7. The reflection holographic memory device according to claim 1, wherein three-dimensional distributions of a plurality of interference patterns caused by interference between a signal light beam and a reference light beam are recorded in a separable manner in a thickness direction of the disk recording medium, whereby the recording capacity is increased.

8. The reflection holographic memory device according to claim 1, wherein the signal light beam is a single-colored blue laser beam, and a converging angle of the signal light beam by the condenser lens is 70 to 90 degrees.

* * * * *